US012527603B2

(12) United States Patent
Biedermann et al.

(10) Patent No.: US 12,527,603 B2
(45) Date of Patent: Jan. 20, 2026

(54) COUPLING DEVICE FOR COUPLING A ROD TO A BONE ANCHOR AND SYSTEM OF SUCH A COUPLING DEVICE AND AT LEAST TWO BONE ANCHORS

(71) Applicant: BIEDERMANN TECHNOLOGIES GMBH & CO. KG, Donaueschingen (DE)

(72) Inventors: Lutz Biedermann, VS-Villingen (DE); Timo Biedermann, Trossingen (DE); Berthold Dannecker, St. Georgen (DE)

(73) Assignee: BIEDERMANN TECHNOLOGIES GMBH & CO. KG, Donaueschingen (DE)

( * ) Notice: Subject to any disclaimer, the term of this patent is extended or adjusted under 35 U.S.C. 154(b) by 56 days.

(21) Appl. No.: 18/611,032

(22) Filed: Mar. 20, 2024

(65) Prior Publication Data
US 2024/0325053 A1    Oct. 3, 2024

Related U.S. Application Data

(60) Provisional application No. 63/600,542, filed on Nov. 17, 2023, provisional application No. 63/493,238, filed on Mar. 30, 2023.

(30) Foreign Application Priority Data

Mar. 30, 2023  (EP) .................................... 23165563

(51) Int. Cl.
*A61B 17/70*   (2006.01)
*A61B 17/00*   (2006.01)

(52) U.S. Cl.
CPC ...... *A61B 17/7002* (2013.01); *A61B 17/7035* (2013.01); *A61B 17/7038* (2013.01);
(Continued)

(58) Field of Classification Search
CPC ........................................ A61B 17/7035–7038
See application file for complete search history.

(56) References Cited

U.S. PATENT DOCUMENTS

| 6,090,111 A | * | 7/2000 | Nichols | A61B 17/7032 606/272 |
| 6,716,214 B1 | * | 4/2004 | Jackson | A61B 17/7032 606/272 |

(Continued)

FOREIGN PATENT DOCUMENTS

| CN | 120154407 A | * | 6/2025 | ......... A61B 17/7038 |
| EP | 1923011 A1 | * | 5/2008 | ......... A61B 17/7032 |

(Continued)

OTHER PUBLICATIONS

Extended European Search Report for Application No. 23165563.0, mailed Sep. 27, 2023, 9 pages.

*Primary Examiner* — Jacqueline T Johanas
(74) *Attorney, Agent, or Firm* — Womble Bond Dickinson (US) LLP

(57) ABSTRACT

A system for coupling a rod to bone includes first and second bone anchors that are different from one another and a coupling device including a receiving part with a central axis and a head receiving portion for interchangeably receiving a head of either the first or second bone anchors, and a pressure member configured to exert pressure on the head of either the first or second bone anchors when the head is in the receiving part to clamp the inserted head at a particular position relative to the receiving part. The coupling device includes a restraining surface configured to cooperate with the first bone anchor to restrict pivoting of the first bone anchor to a single plane. The coupling device is configured to cooperate with the second bone anchor to restrict pivoting (Continued)

of the second bone anchor differently than the restricted pivoting of the first bone anchor.

24 Claims, 14 Drawing Sheets

(52) U.S. Cl.
CPC ...... *A61B 17/7082* (2013.01); *A61B 17/7088* (2013.01); *A61B 2017/00477* (2013.01)

(56) References Cited

U.S. PATENT DOCUMENTS

| | | | |
|---|---|---|---|
| 7,749,258 B2 | 7/2010 | Biedermann et al. | |
| 7,776,067 B2* | 8/2010 | Jackson | A61B 17/7037 606/272 |
| 7,833,252 B2* | 11/2010 | Justis | A61B 17/7035 606/279 |
| 8,398,683 B2* | 3/2013 | Berrevoets | A61B 17/88 606/267 |
| 8,636,783 B2* | 1/2014 | Crall | A61B 17/7037 606/272 |
| 8,888,827 B2 | 11/2014 | Harper et al. | |
| 9,277,938 B2 | 3/2016 | Biedermann et al. | |
| 10,130,396 B2* | 11/2018 | Vedula | A61B 17/7032 |
| 10,463,402 B2* | 11/2019 | Biester | A61B 17/7007 |
| 11,234,745 B2* | 2/2022 | Jackson | A61B 17/7037 |
| 2006/0217716 A1* | 9/2006 | Baker | A61B 17/7037 606/301 |
| 2007/0090238 A1 | 4/2007 | Justis | |
| 2010/0324599 A1 | 12/2010 | Montello et al. | |
| 2012/0046701 A1 | 2/2012 | Gennari et al. | |
| 2013/0150904 A1* | 6/2013 | Biedermann | A61B 17/84 606/328 |
| 2016/0113684 A1 | 4/2016 | Rezach et al. | |
| 2017/0143379 A1 | 5/2017 | Walker et al. | |
| 2018/0263666 A1* | 9/2018 | Cain | A61B 17/7037 |
| 2019/0046242 A1 | 2/2019 | Vedula et al. | |
| 2019/0105085 A1 | 4/2019 | Hawkes et al. | |
| 2021/0059723 A1 | 3/2021 | Biedermann et al. | |
| 2022/0087721 A1 | 3/2022 | Yacoub | |
| 2023/0008092 A1* | 1/2023 | Jackson | A61B 17/8605 |
| 2024/0325053 A1* | 10/2024 | Biedermann | A61B 17/7088 |

FOREIGN PATENT DOCUMENTS

| | | | | |
|---|---|---|---|---|
| EP | 3 673 844 A1 | | 7/2020 | |
| EP | 4437983 A1 | * | 10/2024 | ......... A61B 17/7082 |
| JP | 2024508174 A | * | 2/2024 | ......... A61B 17/7038 |
| WO | WO-2011135013 A1 | * | 11/2011 | ......... A61B 17/7032 |

* cited by examiner

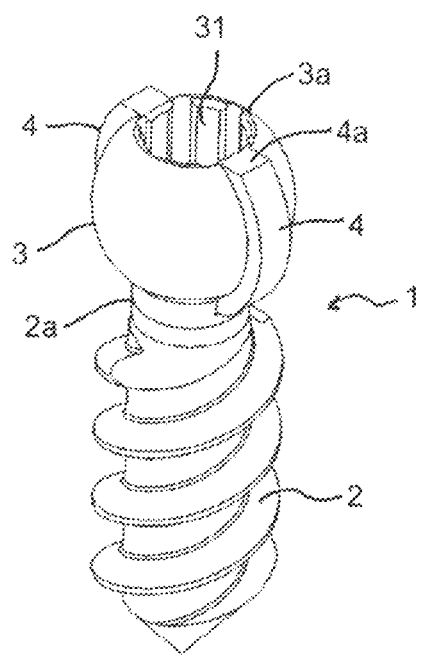
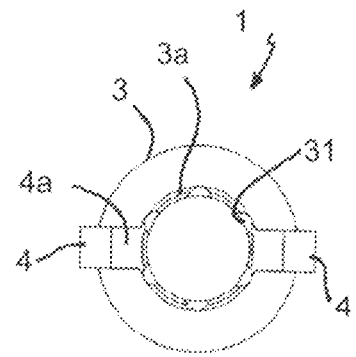
Fig. 12        Fig. 13
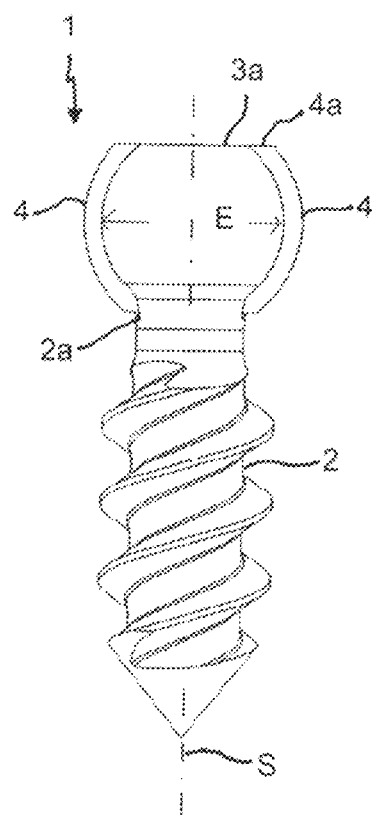
Fig. 14

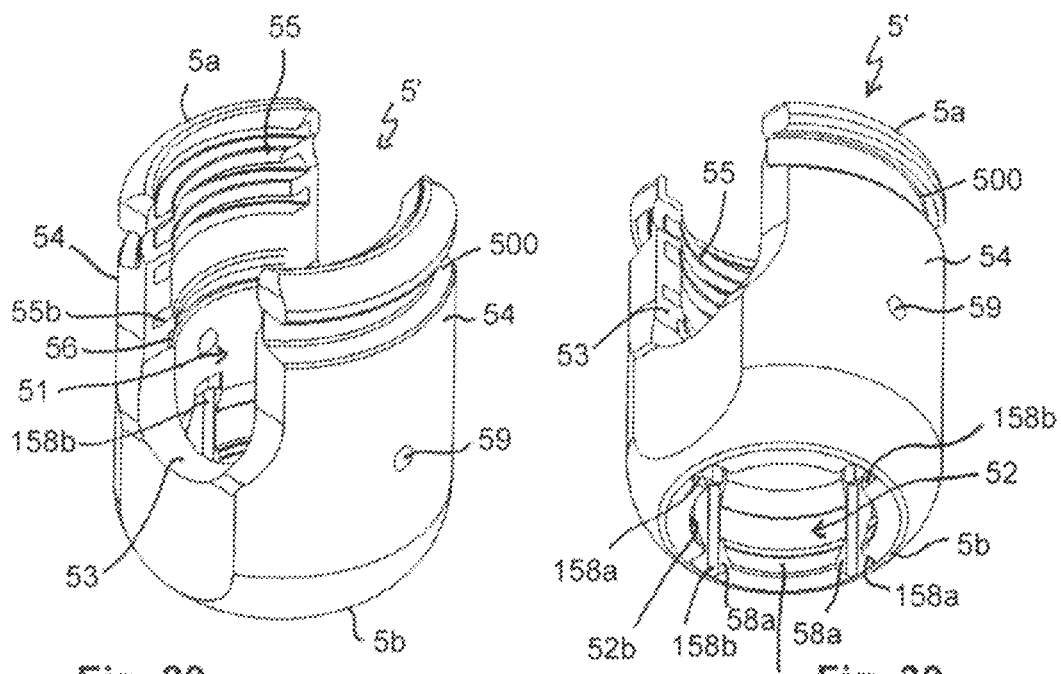
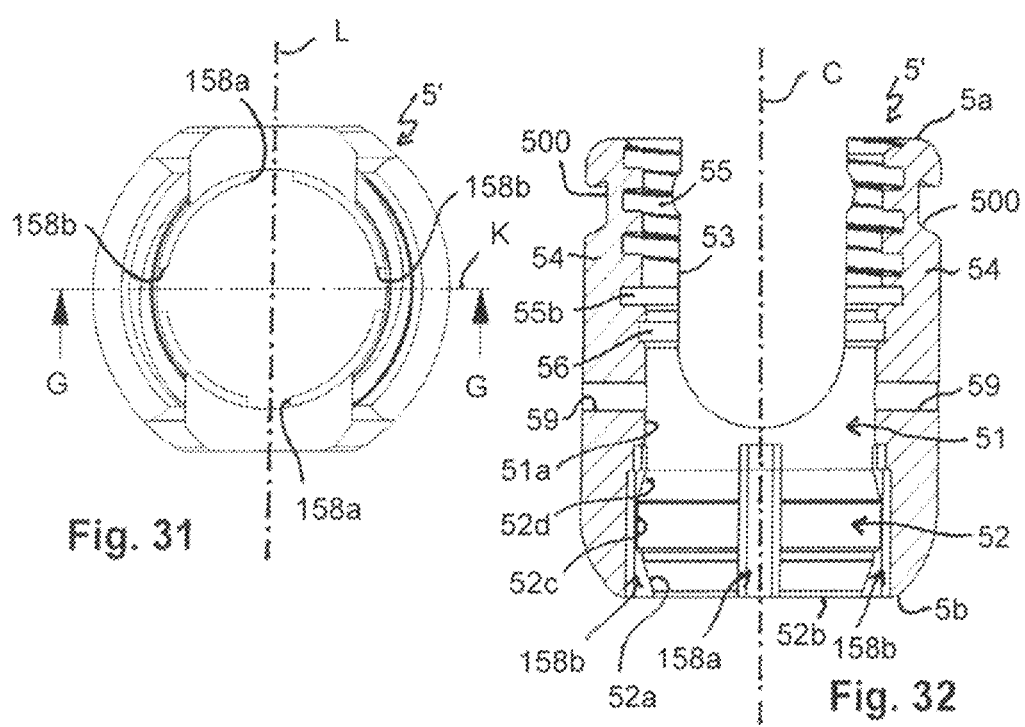

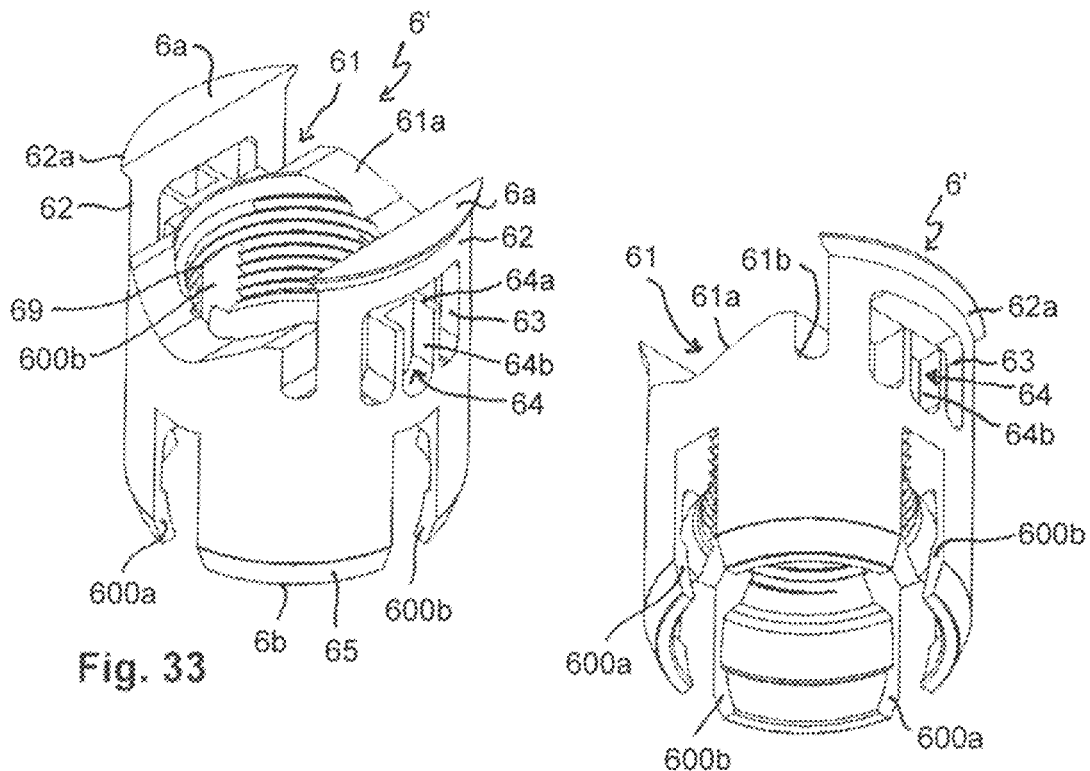
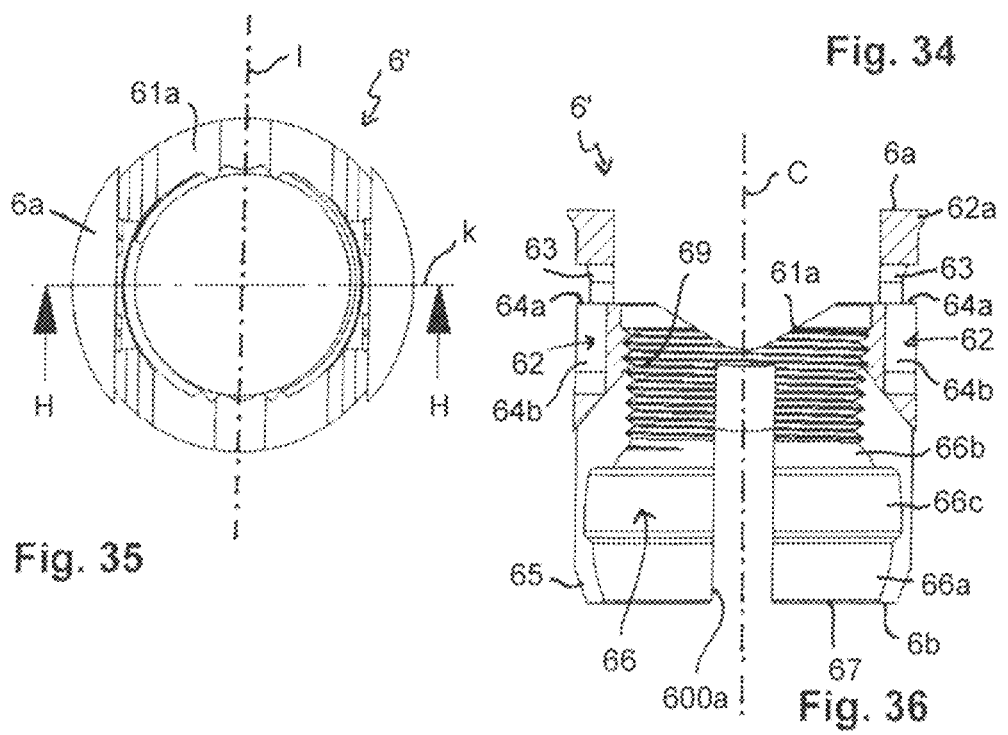

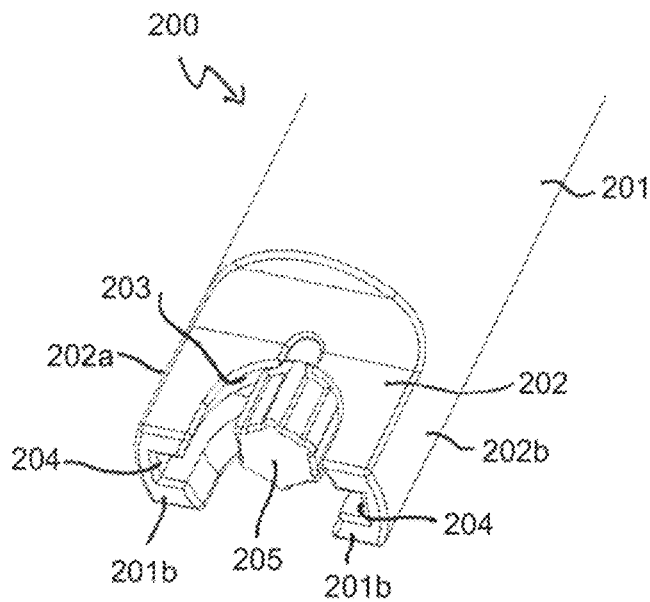
Fig. 39
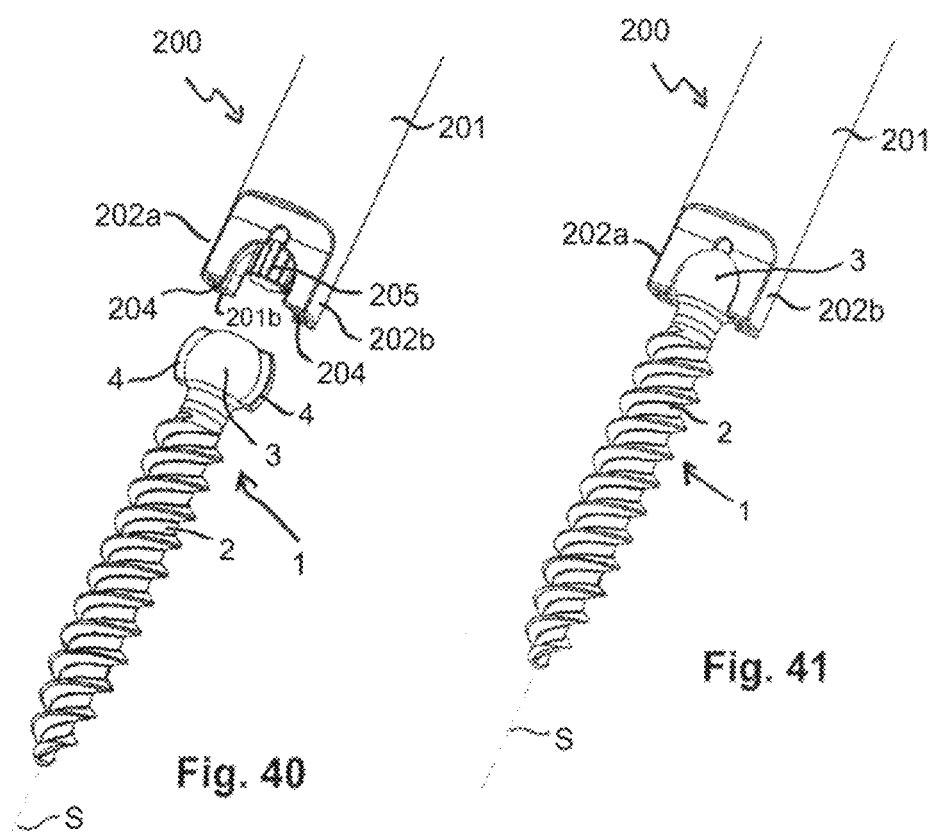
Fig. 40
Fig. 41

COUPLING DEVICE FOR COUPLING A ROD TO A BONE ANCHOR AND SYSTEM OF SUCH A COUPLING DEVICE AND AT LEAST TWO BONE ANCHORS

CROSS-REFERENCE TO RELATED APPLICATION(S)

The present application claims priority to and the benefit of U.S. Provisional Patent Application Nos. 63/493,238, filed Mar. 30, 2023 and 63/600,542, filed Nov. 17, 2023, the contents of which are hereby incorporated by reference in their entirety, and claims priority from European Patent Application EP 23 165 563.0, filed Mar. 30, 2023, the contents of which are hereby incorporated by reference in their entirety.

BACKGROUND

Field

The application relates to a coupling device for coupling a rod to a bone anchor. The bone anchor can be of a first type or a different second type which can be used in an interchangeable manner. The application also relates to a system including such a coupling device and at least two different bone anchors.

Description of Related Art

In spinal surgery, modular bone anchors are known that can, at the choice of a user, be assembled from interchangeable parts to allow use of the bone anchor for different applications. For example, U.S. Pat. No. 9,277,938 B2 describes a polyaxial bone anchoring system that includes a receiving part having an accommodation space, a first anchoring element having a first head, a sleeve-like insert piece configured to be arranged around a portion of the first head and to be arranged in the accommodation space, a second anchoring element having a second head, and a pressure member configured to exert pressure onto the first head or the second head, wherein the first bone anchoring element and the second bone anchoring element are configured to be interchangeably connectable to the receiving part. One of the bone anchoring elements is configured to pivot at a larger pivot angle compared to the other bone anchoring element. Hence, depending on the clinical application, the first or the second bone anchoring element can be combined with the receiving part.

US 2016/0113684 A1 describes a modular spinal implant system including an array of members, such as, for example, receivers that can be selectively coupled to members, such as, for example, bone screw shafts. In some embodiments, the spinal implant system includes a crown configured to mate with a drive portion of a head of a screw shaft, the crown being configured to prevent the shaft from rotating along any axis and/or with any plane. In some embodiments, the crown is employed with a receiver having uni-axial screw functionality. In other embodiments, the crown is employed with a receiver having multi-axial screw functionality.

U.S. Pat. No. 7,749,258 B2 describes a monoplanar bone anchoring device including a receiving part for receiving a rod, a pressure element and a bone anchoring element being movable relative to the receiving part in a limited angular range about the longitudinal axis of the receiving part, the angles lying in a single plane. The movement of the bone anchoring element relative to the receiving part is limited by a form fit connection with cooperating guiding surfaces at the head of the bone anchoring element and at the pressure element.

SUMMARY

There is still a need to provide a simple modular bone anchoring system with few parts that allows implementation of a polyaxial bone anchoring device, a monoplanar bone anchoring device, and/or a monoaxial bone anchoring device.

Thus, it is an object of the invention to provide a coupling device that can be used in a modular bone anchoring device, and that enables a selectable functionality in terms of a polyaxial, monoplanar, and/or monoaxial design. It is also an object of the invention to provide a bone anchoring system that includes such a coupling device and at least two bone anchors that provide different functionality to the bone anchoring device.

According to an embodiment, a coupling device for coupling a rod to a first bone anchor of a first type or to a second bone anchor of a second type includes a receiving part having a rod receiving portion for receiving the rod and a head receiving portion for pivotably receiving a head of the first bone anchor or a head of the second bone anchor, such that a shank of at least one of the first or the second bone anchor can assume a plurality of angular positions relative to a pivot axis extending through the head receiving portion, and a pressure member that is configured to exert pressure on an inserted head of the first bone anchor or the second bone anchor to clamp the head at a particular angular position. The coupling device has a restraining structure by means of which the coupling device is configured to cooperate with the first bone anchor such that the first bone anchor is configured to pivot with respect to the pivot axis in a single plane, or with the second bone anchor such that the second bone anchor is configured to pivot with respect to the pivot axis in multiple planes.

According to another embodiment, the coupling device is additionally or alternatively configured for coupling a rod to a third bone anchor of a third type. In this embodiment, the restraining structure of the coupling device is configured to cooperate with the third bone anchor such that the third bone anchor is prevented from pivoting relative to the coupling device and/or has a fixed orientation of its shank axis with respect to the pivot axis.

By selecting and assembling the first bone anchor with the coupling device, the bone anchoring device can be used as a monoplanar bone anchoring device. By selecting and assembling the second bone anchor with the coupling device, the bone anchoring device can be used as a polyaxial bone anchoring device. By selecting the third bone anchor, the bone anchoring device can be used as a monoaxial bone anchoring device. Since the same coupling device can be used with different bone anchors, the surgeon has a more flexible and versatile choice of implant combinations, while the number of parts per set is reduced.

In addition, as the receiving part and the pressure member are more expensive to manufacture compared to the bone anchor, the manufacturing costs and/or the costs for stockholding can be decreased if the same coupling device can be used for more than one clinical application.

In a further embodiment, the restraining structure of the coupling device defines a first single plane in which the first bone anchor is configured to pivot with respect to the pivot axis, and also defines a second single plane in which the first bone anchor is configured to pivot with respect to the pivot axis, wherein the second single plane is different from the first single plane. The first bone anchor is configured to be selectively coupled to the coupling device in a first orientation so as to be pivotable in the first single plane, or in a second orientation so as to be pivotable in the second single plane. Thus, a monoplanar coupling device having different pivot planes may be provided.

In a further embodiment, a first insert member can be added to the coupling device. The insert member is positionable in the pressure member and can assume at least two positions in which the assembly exerts a different compression force onto a head of a bone anchor that is received in the coupling device. By means of this, the frictional force between the head and the pressure member can be adjusted such that the pressure member is allowed to provisionally lock the bone anchor relative to the coupling device in a particular angular position even if the rod is not yet inserted. This permits carrying out of adjustment steps without the need of having the rod and/or a fixation member inserted in the rod channel.

In a still further embodiment, a second insert member may be provided that is configured to be inserted into the pressure member and that engages the head of a bone anchor in a form fit manner. By means of this, a monoaxial bone anchoring device can be implemented.

By selecting the first or the second insert, the choice of implant combinations can be further enlarged while still having fewer parts, each of which is of simple design.

According to the embodiments, the bone anchoring device is of a bottom loading type, i.e., the bone anchor can be inserted from a bottom end of the receiving part. However, the bone anchoring device may also be of a top loading type, i.e., the bone anchor may be inserted from a top end of the receiving part.

A system including the coupling device and at least two different bone anchors may include the coupling device, a first bone anchor of a first type, and a second bone anchor of a second type, wherein the coupling device can be combined with the first bone anchor to form a monoplanar bone anchoring device in which the bone anchor can pivot only in a single plane, or with the second bone anchor to form a polyaxial bone anchoring device in which the bone anchor can pivot in multiple planes.

In a further embodiment, a system including a coupling device and at least two bone anchors may include the coupling device and the first bone anchor of the first type and/or the second bone anchor of the second type, and a third bone anchor of a third type, wherein the coupling device can be combined with the first bone anchor to form a monoplanar bone anchoring device in which the bone anchor can pivot only in a single plane, with the second bone anchor to form a polyaxial bone anchoring device in which the bone anchor can pivot in multiple planes, or with the third bone anchor to form a monoaxial bone anchoring device in which the third bone anchor is prevented from pivoting relative to the coupling device.

According to a still further embodiment, a monoplanar bone anchoring device includes a coupling device for coupling a rod to a bone anchor, the coupling device including a receiving part having a rod receiving portion for receiving the rod and a head receiving portion for pivotably receiving a head of the bone anchor such that a shank of bone anchor can assume a plurality of angular positions relative to a pivot axis extending through the head receiving portion, and a pressure member that is configured to exert pressure on an inserted head to clamp the head at a particular angular position. The coupling device has a restraining structure by means of which the coupling device is configured to cooperate with the bone anchor, such that the bone anchor can pivot with respect to the pivot axis in a single plane. The bone anchoring device further includes a bone anchor with a cooperating restraining structure that is configured to cooperate with the restraining structure of the coupling device, wherein the restraining structure of the coupling device has at least one recess and the restraining structure of the bone anchor has at least one protrusion configured to engage the recess, such as to limit a pivoting movement of the bone anchor relative to the receiving part to a single plane.

According to a still further embodiment, a monoaxial bone anchoring device includes a coupling device for coupling a rod to a bone anchor, the coupling device including a receiving part having a rod receiving portion for receiving the rod and a head receiving portion for receiving a head of the bone anchor, and a pressure member that is configured to exert pressure on an inserted head. The coupling device has a restraining structure by means of which the coupling device is configured to cooperate with the bone anchor, such that a shank of bone anchor can assume only one fixed angular position relative to a central axis extending through the head receiving portion, preferably such that a shank axis and the central axis are coincident. The bone anchoring device further includes a bone anchor having a mating restraining structure that is configured to cooperate with the restraining structure of the coupling device, wherein the restraining structure of the coupling device has at least two recesses and the restraining structure of the bone anchor has a corresponding number of protrusions configured to engage the recesses, the recesses and protrusions being shaped and arranged such as to prevent a pivoting movement of the bone anchor relative to the receiving part.

According to a further embodiment, an instrument is provided for inserting a bone anchor into bone, the bone anchor having a head and a shank, wherein the head has a substantially spherically-shaped outer surface portion and a restraining structure at the outer surface that is configured to cooperate with a restraining structure of a coupling device, preferably wherein the restraining structure of the bone anchor is a projection with at least one wing that extends away from a shank axis of the shank, the wing preferably extending parallel to the shank axis along the spherically-shaped outer surface portion of the head, wherein the instrument includes an engagement structure configured to engage the restraining structure of the head for coupling the instrument to the bone anchor, so as to prevent rotation of the bone anchor relative to the instrument. The bone anchor can in particular be the first bone anchor and/or the third bone anchor described herein.

Since the instrument engages the bone anchor at the restraining structure, an additional engagement feature such as, for example, a polygonal engagement feature for engaging the head may not be required.

As used in the present specification and in the appended claims, the term "rod" shall be understood as including any elongate member, regardless of the cross-sectional shape of the elongate member. Specifically, a spinal stabilization rod as used herein may have a substantially circular, oval, or angular cross-section. Such a cross-section may also vary along a length of the rod.

BRIEF DESCRIPTION OF THE DRAWINGS

Further features and advantages of the invention will become apparent from the description of embodiments by means of the accompanying drawings. In the drawings:

FIG. 12 shows a perspective view from a top of a first bone anchor of the system of FIG. 1.

FIG. 13 shows a top view of the first bone anchor of FIG. 12.

FIG. 14 shows a side view of the first bone anchor of FIGS. 12 and 13.

FIG. 29 shows a perspective view from a top of a receiving part of the coupling device of FIGS. 27 and 28.

FIG. 30 shows a perspective view from a bottom of the receiving part of FIG. 29.

FIG. 31 shows a top view of the receiving part of FIGS. 29 and 30.

FIG. 32 shows a cross-sectional view of the receiving part of FIGS. 29 to 31, the cross-section taken along line G-G in FIG. 31.

FIG. 33 shows a perspective view from a top of a pressure member of the coupling device of FIGS. 27 and 28.

FIG. 34 shows a perspective view from a bottom of the pressure member of FIG. 33.

FIG. 35 shows a top view of the pressure member of FIGS. 33 and 34.

FIG. 36 shows a cross-sectional view of the pressure member of FIGS. 33 to 35, the cross-section taken along line H-H in FIG. 35.

FIG. 39 shows a perspective view of a portion of an instrument for inserting a bone anchor into bone according to an embodiment, wherein the bone anchor has a restraining structure.

FIG. 40 shows a perspective view of a portion of the instrument of FIG. 39 and the first bone anchor of FIGS. 12 to 14.

FIG. 41 shows a perspective view of a portion of the instrument and the first bone anchor of FIG. 40 in an engaged state.

DETAILED DESCRIPTION

Figures 1, 2:
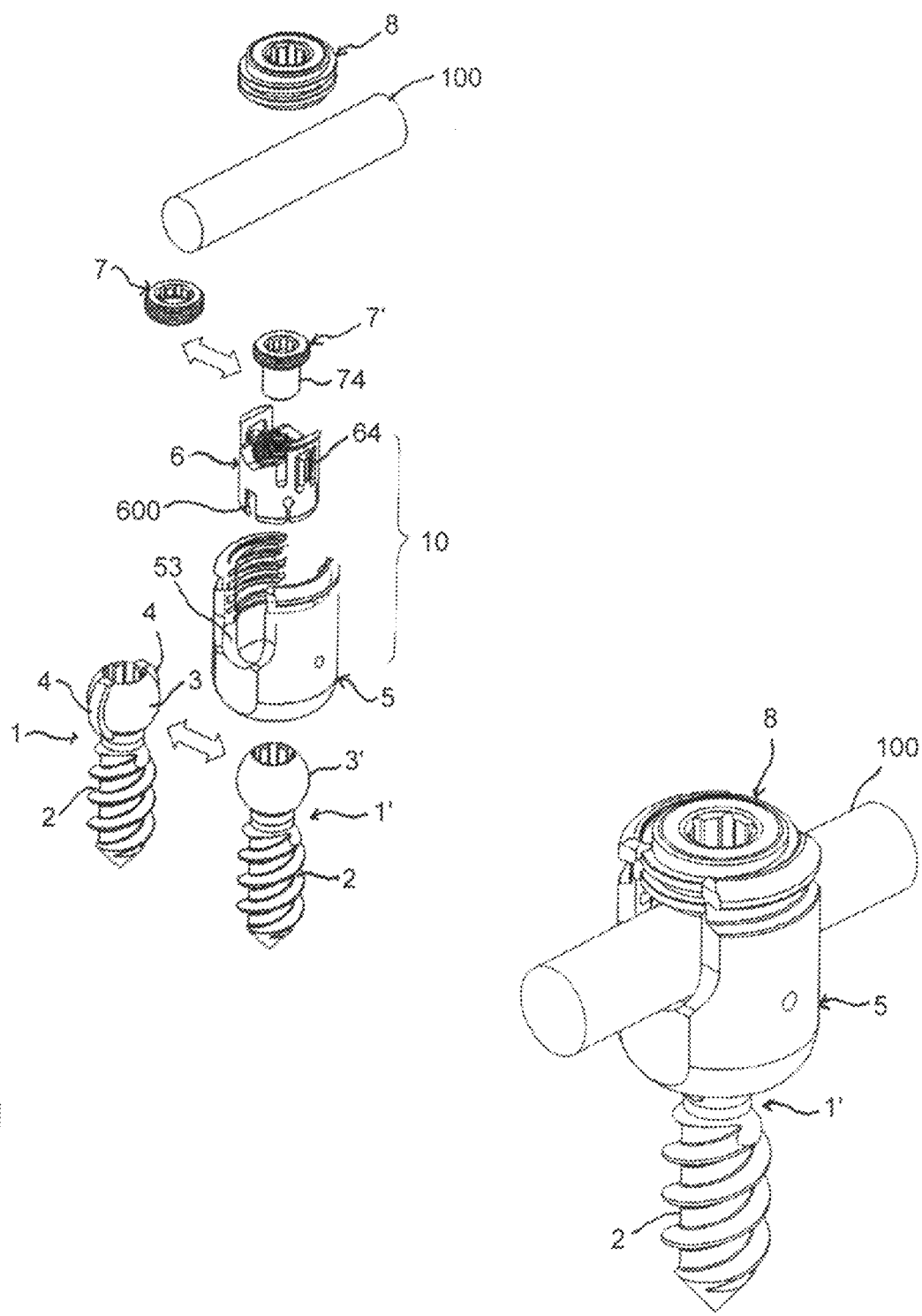
FIG. 1 shows a perspective exploded view of a system according to an embodiment, including a coupling device with two bone anchors and two inserts members that can be used in an interchangeable manner.
FIG. 2 shows a perspective view of an embodiment of a bone anchoring device assembled from parts of the system of FIG. 1.
Figure 3:
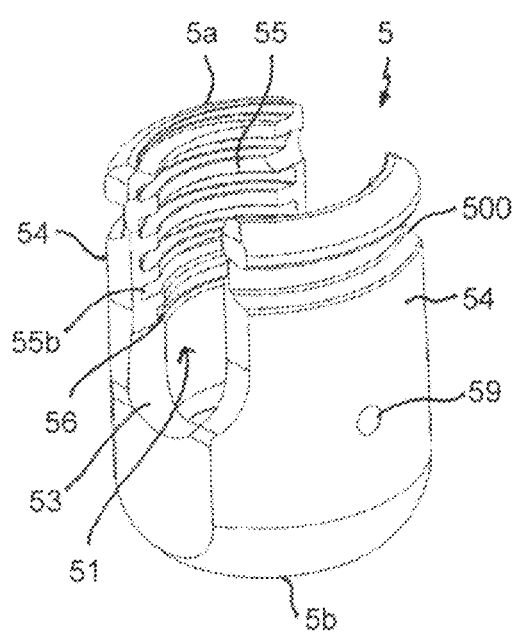
FIG. 3 shows a perspective view from a top of a receiving part of the coupling device of FIGS. 1 and 2.

Referring to FIG. 1, a system including a coupling device and at least two bone anchors according to an embodiment includes at least a first bone anchor 1 of a first type and a second bone anchor 1' of a second type, and a coupling device 10 that is connectable to the first bone anchor 1 or the second bone anchor 1'. When the coupling device 10 is assembled with the first bone anchor 1, the resulting bone anchoring device is an monoplanar bone anchoring device in which the first bone anchor 1 can pivot only in a single plane. When the coupling device is assembled with the second bone anchor, the resulting bone anchoring device is a polyaxial bone anchoring device in which the bone anchor can pivot in multiple planes. Thus, the first bone anchor 1 and the second bone anchor 1' may be interchangeably used together with the same coupling device 10.

The coupling device 10 includes a receiving part 5 and a pressure member 6. The receiving part 5 is configured to accommodate a head 3 of the first bone anchor 1 or a head 3' of the second bone anchor 1' and a rod 100. The pressure member 6 is configured to be positionable in the receiving part 5 and to exert pressure onto an inserted head. Optionally, the system may further include a first insert member 7 and/or a second insert member 7' that is positionable in the pressure member 6 and moveable relative thereto to act onto an inserted head. Optionally, the insert member 7 and the insert member 7' may be used interchangeably with the coupling device 10 assembled with the second bone anchor 1'. Furthermore, a fixation device in the form of, for example, a fixation screw 8 is provided for securing and fixing the rod 100 in the receiving part 5.

FIG. 2 shows the second bone anchor 1' assembled with the coupling device 10 and the rod 100 inserted and fixed by the fixation member 8.

As depicted in greater detail in FIGS. 3 to 6, the receiving part 5 may be substantially cylindrical and has a first end or top end 5a, a second end or bottom end 5b, and a passage 51 extending from the top end 5a towards the bottom end 5b and defining a longitudinal central axis C.

Preferably, the receiving part is a monolithic piece. Adjacent to the bottom end 5b, a head receiving portion 52 is formed for accommodating a head of one of the bone anchors and also a portion of the pressure member 6. The head receiving portion 52 has a narrowing portion 52a adjacent to the bottom end 5b that cooperates with a corresponding narrowing outer surface portion of the pressure member 6 to clamp the pressure member around an inserted head. At the bottom end 5b, the passage 51 provides an opening 52b that has a greatest width that is greater than a maximum width of heads of the bone anchors to be inserted. By means of this, the head can be inserted into the receiving part 5 from the bottom end 5b. The passage 51 widens from the narrowing portion 52a in the direction of the top end into a widened section 52c that provides space for a portion of the pressure member 6 to expand therein for inserting the head. From the widened section 52c, a inversely narrowing section 52d extends towards the top end 5a and is followed by a portion 51a of the passage 51 with a substantially constant width that is smaller than that of the widened section 52c.

The receiving part 5 further has a rod receiving portion that includes a substantially U-shaped recess 53 extending from the top end 5a to a distance therefrom. The substantially U-shaped recess 53 divides the receiving part 5 into two legs 54 and forms a channel for receiving the rod 100. An internal thread 55, for example, a square thread, is provided at the receiving part 5 adjacent to the top end 5a for cooperating with the fixation member 8. At the lower end of the internal thread 55, there may be an undercut 55b. An upper edge of this undercut 55b may serve as an abutment for preventing the pressure member 6 from moving upwards when the head is inserted. Moreover, a circumferential groove 56 may also be provided at the inner wall of each of the legs 54 at a position below the undercut 55b in a direction towards the bottom end 5b. The groove 56 may serve as a securing structure that holds the pressure member 6 in a position when the head is inserted and the pressure member engages the narrowing portion 52a of the head receiving portion so that the inserted head cannot be removed.

Figure 4:
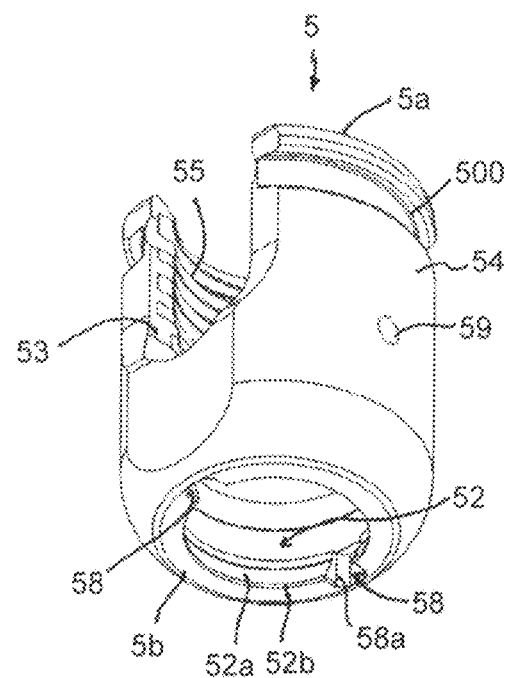
FIG. 4 shows a perspective view from a bottom of the receiving part of FIG. 3.
Figure 5:
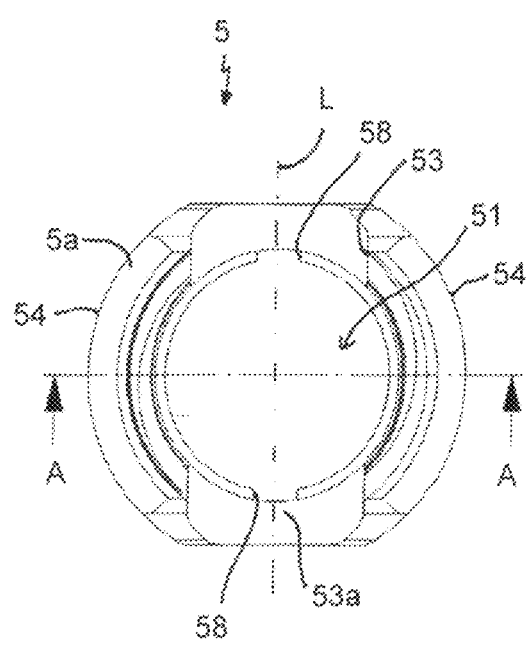
FIG. 5 shows a top view of the receiving part of FIGS. 3 and 4.
Figure 6:
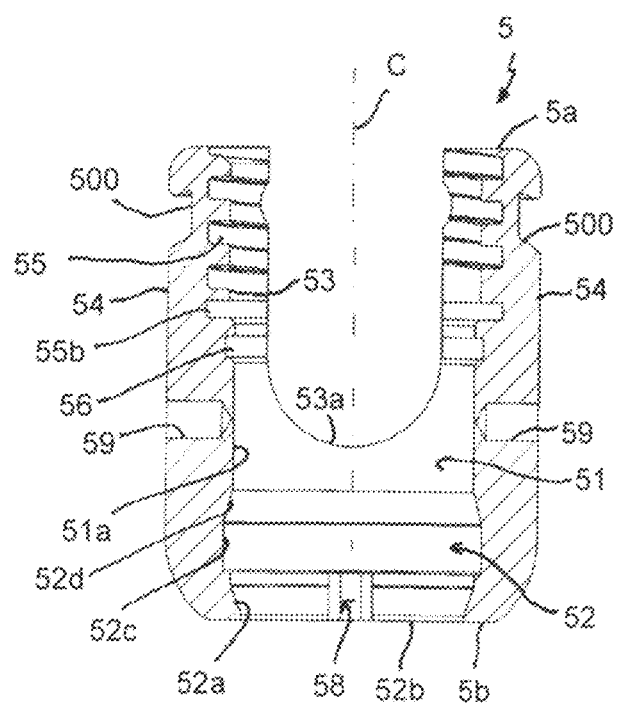
FIG. 6 shows a cross-sectional view of the receiving part of FIGS. 3 to 5, the cross-section taken along line A-A in FIG. 5.
Figure 7:
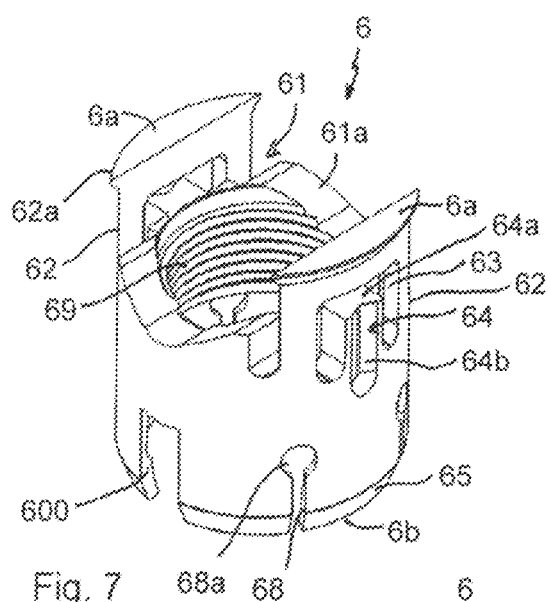
FIG. 7 shows a perspective view from a top of a pressure member of the coupling device of FIGS. 1 and 2.
Figure 8:
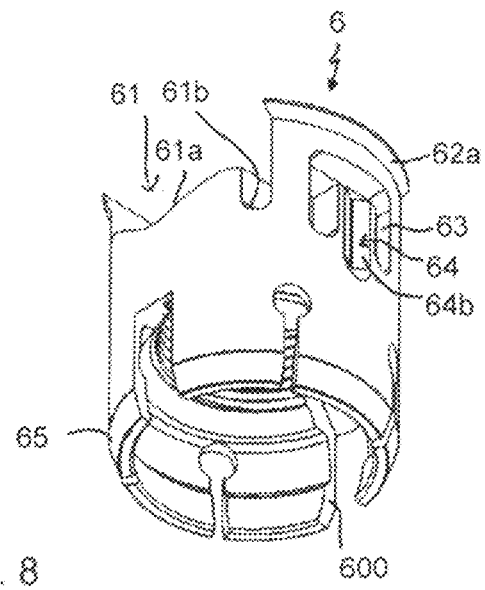
FIG. 8 shows a perspective view from a bottom of the pressure member of FIG. 7.
Figure 9:
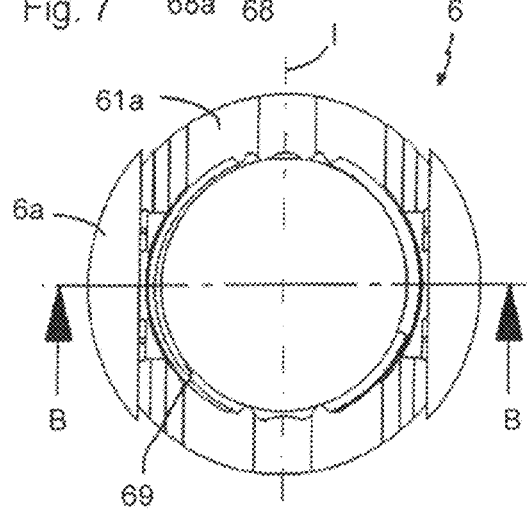
FIG. 9 shows a top view of the pressure member of FIGS. 7 and 8.

The substantially U-shaped recess 53 defines a longitudinal axis L of the rod channel. As best shown in FIGS. 4 to 6, two opposite recesses or slots 58 are formed at and extend from the bottom end 5b to approximately the widened section 52c of the receiving part 5. The recesses are offset from each other by 180° and are aligned with the channel axis L when seen in a top view, as shown in FIG. 5. An inner contour of the recesses 58 may be substantially rectangular with rounded edges 58a. By means of the recesses 58, it is possible to insert the head 3 of the first bone anchor 1 from the bottom end 5b, as explained in greater detail below. Specifically, the recesses 58 define a restraining structure or a part of such a restraining structure, that restrains a pivoting motion of an inserted head of a bone anchor to a single plane including the central axis C.

In addition, at the center of each of the legs 54 in the circumferential direction, a transverse crimp bore 59 is formed. The crimp bores 59 may be located in the axial direction around approximately the height of a bottom 53a of the U-shaped recess 53. When the pressure member 6 is mounted to the receiving part 5, a crimping operation can be carried out that results in small protrusions at the inner wall of the legs 54 at the positions of the crimp bores 59 which protrude into the passage 51 and which are configured to engage a portion of the pressure member 6 to prevent rotation of the pressure member 6.

Lastly, close to the top end 5a, a circumferential groove 500 is formed on each of the legs that may serve as an engagement portion for an instrument.

Referring in addition to FIGS. 7 to 11, the pressure member 6 will be described in greater detail. Preferably, the pressure member 6 is a monolithic piece. The pressure member 6 has a first end or top end 6a and a second end or bottom end 6b, and may be substantially cylindrical with an outer diameter that allows the pressure member to move in the passage 51 of the receiving part 5. At the top end 6a, a rod receiving recess 61 is formed that provides a rod support surface 61a. The rod support surface 61a may have a substantially V-shaped cross-section with a longitudinal axis I extending substantially perpendicular to the cylinder axis of the pressure member 6, the latter of which is configured to coincide or align with the central axis C of the receiving part 5 when the pressure member 6 is positioned in the receiving part 5. A depth of the rod receiving recess 61 may be smaller than a diameter of the rod 100. Hence, when the rod 100 rests on the support surface 61a, the rod projects above the top end 6a of the pressure member 6, as shown, for example, in FIGS. 23 and 24. The V-shape of the rod support surface 61a permits use of rods with different diameters.

Moreover, the rod receiving recess 61 is shaped such that two free legs 62 are formed that may be separated from the rod support surface 61a on each side by a groove 61b. By means of this, the legs 62 are slightly flexible in a direction transverse to the longitudinal axis of the rod support surface 61a. A free end of the legs 62 may have a radially protruding rim 62a at an upper surface which forms the first end 6a of the pressure member 6. The rim 62a is configured to engage the undercut 55b or the grooves 56 provided at the inner surface of the legs 54 of the receiving part 5, to secure an insertion position or a pre-locking position of the pressure member 6 in the receiving part 5. At the center of each of the legs 62 in a circumferential direction, a cutout 63 is made whereby a portion of the legs 62 forms a finger 64 that extends such that a free end 64a of the finger 64 faces towards the top end 6a. In the outer surface of each of the fingers 64, an axially extending groove 64b is formed that may extend slightly inwardly relative to other portions of the outer wall of the legs 62 below the cutout 63. The grooves 64b are configured to be engaged by the protrusions formed by crimping the crimp bores 59 provided in the receiving part 5.

Figure 11:
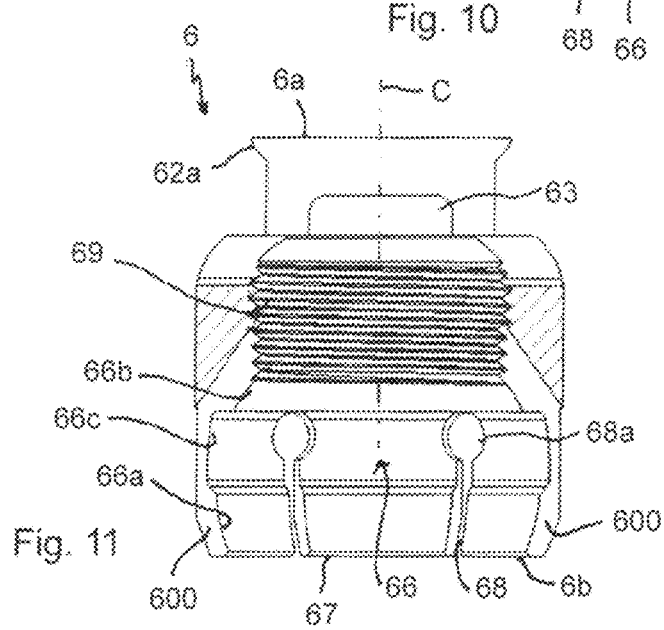
FIG. 11 shows another cross-sectional view of the pressure member of FIGS. 7 to 10, the cross-section taken in a plane that is 90° rotated with respect to the plane of FIG. 10.

Adjacent to the bottom end 6b of the pressure member 6, an outer surface portion 65 is provided that may be tapered, preferably conically-shaped, and that is configured to cooperate with the narrowing section 52a of the receiving part 5. Further, a hollow head receiving portion 66 is formed in the pressure member 6 that defines an opening 67 at the second end 6b for inserting a head of the bone anchor. The head receiving portion 66 may have a lower substantially spherical section 66a and an upper substantially spherical section 66b that are shaped so as to matingly receive a spherical head of the bone anchor therein. An intermediate section 66c has a greater inner width for facilitating the insertion of the head. In addition, a plurality of slits 68 are provided that extend completely through the pressure member 6 into the widened section 66c. The slits 68 are open to the second end 6b and are closed at their opposite end. At the closed end, the slits may have a widened section 68a that may, for example, be circular. As shown in FIG. 11, the closed end of the slits 68 may be located at an upper end of the widened section 66c of the head receiving portion 66. In the embodiment shown, four slits may be present, two on each side of the rod support surface 61a, that may be positioned symmetrically with respect to the cutout 63 in the circumferential direction. However, the number and arrangement of the slits may vary, depending on the desired flexibility of the head receiving portion 66.

A coaxial threaded bore 69 that is coaxial with the central axis C extends through the rod support surface 61a into the head receiving portion 66, and permits access to an inserted head with an instrument. The bore 69 may be fully or partially threaded and is configured to receive the first insert 7 or the second insert 7' such that the insert can be advanced and retracted therein in the axial direction.

Figure 10:
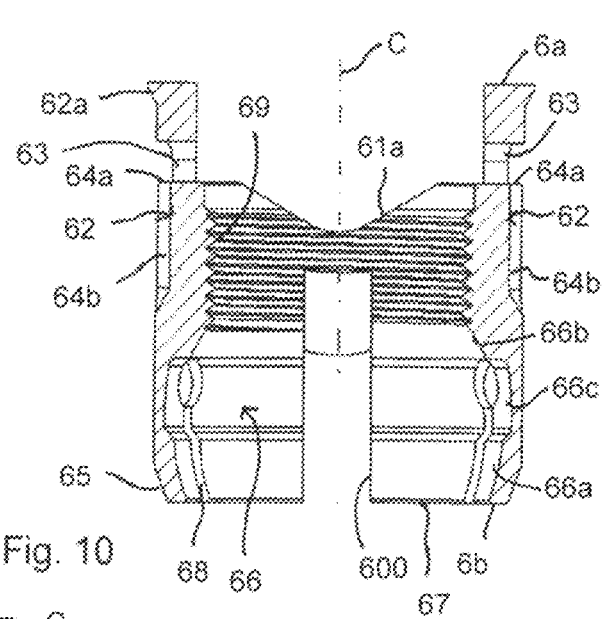
FIG. 10 shows a cross-sectional view of the pressure member of FIGS. 7 to 9, the cross-section taken along line B-B in FIG. 9.

Lastly, two opposite recesses or slots 600 are formed in the lower portion of the pressure member 6. The recesses 600 are offset from each other by 180° and are aligned with the longitudinal axis I of the rod support surface 61a. The recesses 600 are open to the second end 6b and closed towards the first end 6a. Preferably, the recesses 600 extend in the axial direction into the wall of the threaded bore 59. As best seen in FIG. 10, an inner contour of the recesses 600 may be rectangular. The size of the recesses 600 is such that a portion of the first bone anchor 1 can extend therein, as described in greater detail below. When the pressure member 6 is mounted to the receiving part 5, the recesses 600 are aligned with the recesses 58 of the receiving part 5. Thus, the recesses 600 define a restraining structure that restrains a pivoting motion of the first bone anchor 1 to a single plane that includes the central axis C. The central axis C therefore defines the pivot axis.

Referring further to FIGS. 12 to 14, the first bone anchor 1 will be described in greater detail. The bone anchor 1 has a shank 2 with a shank axis S, wherein the shank is preferably fully or partially threaded, and a head 3 with a free end 3a. Between the head 3 and the shank 2, there may be a neck portion 2a. The head 3 has a spherical outer surface portion that includes a region with a greatest diameter E of the sphere. Preferably, the spherical outer surface portion is, in the axial direction, substantially symmetrical with respect to a plane including the plane of the greatest outer diameter E. In addition, the head 3 has two opposite wings 4 that extend along the spherical surface from the free end 3a of the head 3 up to the neck 2a. The wings 4 are offset by 180°, are symmetrical with respect to a middle plane including the shank axis S, and each has a shape of a segment of a spherical shell. An upper end 4a of the wings is flat and forms part of the free end 3a of the head 3. A width of the wings 4 is such that, when the head 3 is received in the head receiving portion 66 of the pressure member 6, the wings 4 can extend into the recesses 600 and pivot therein. Thus, the wings 4 form a restraining structure or a part of a restraining structure that cooperates with the corresponding restraining structure in the form of the recesses 600 provided at the pressure member 6, to limit or restrain the pivoting motion of the head 3 in the head receiving portion 66 to a single plane. It shall be noted that the width of the wings 4 is such that when the head 3 passes through the lower opening 52b of the receiving part 5 during insertion, the wings 4 pass through the recesses 58 at the bottom end 5b of the receiving part 5.

Moreover, at the free end 3a, a tool engagement recess 31 is formed that may have a polygon or any other engagement structure, such as, for example, a torx-shaped or star-shaped or other axial groove-shaped structure suitable to screw the bone anchor 1 into bone. Additionally, a coaxial recess 32 with a bottom 32a that may have a slightly smaller diameter than the tool engagement recess 31 may be provided for receiving the second insert member 7', similarly as explained below with respect to the second bone anchor 1'.

Figures 15, 16:
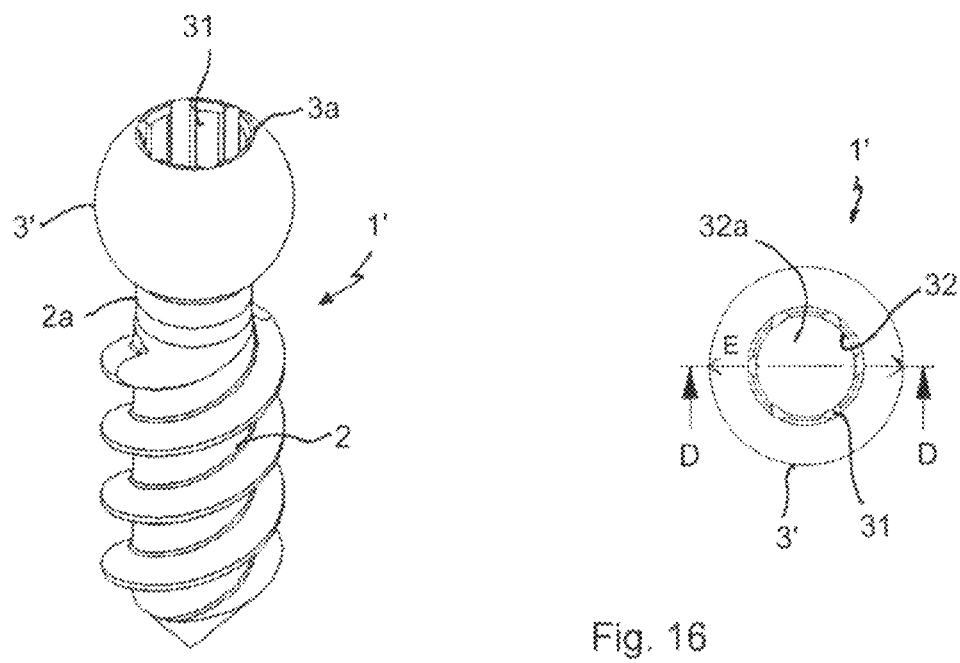
FIG. 15 shows a perspective view from a top of a second bone anchor of the system of FIG. 1.
FIG. 16 shows a top view of the second bone anchor of FIG. 15.
Figure 17:
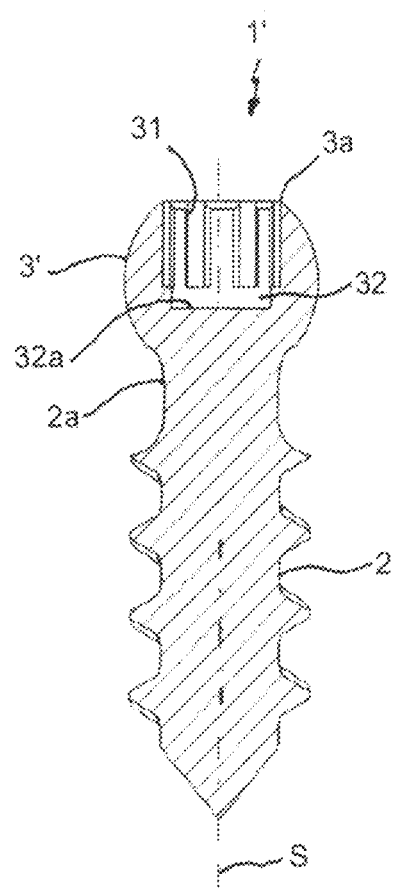
FIG. 17 shows a cross-sectional view of the second bone anchor of FIGS. 15 and 16, the cross-section taken along line D-D in FIG. 16.

Referring to FIGS. 15 to 17, the second bone anchor 1' will be described in greater detail. Parts and portions that are identical to the first bone anchor 1 are marked with the same reference numerals, and the descriptions thereof will not be repeated. The second bone anchor 1' differs from the first bone anchor 1 in that the head 3' of the second bone anchor lacks the wings 4. Hence, the outer surface of the head 3' is uniformly spherically-shaped between the neck portion 2a and the free end surface 3a. As a result, when the second bone anchor 1' is inserted into the coupling device 10, the head 3' can freely pivot in the head receiving portion 66 of the pressure member 6 without being restrained. This means the second bone anchor 1' can pivot relative to the central axis C in multiple planes, even in an unlimited number of planes.

Figure 18:
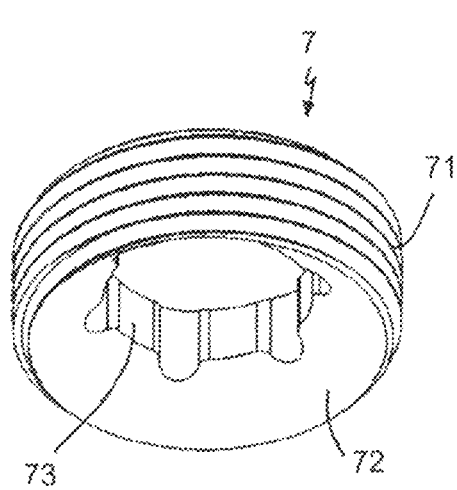
FIG. 18 shows a perspective view from a bottom of a first insert member of the system of FIG. 1.
Figure 19:
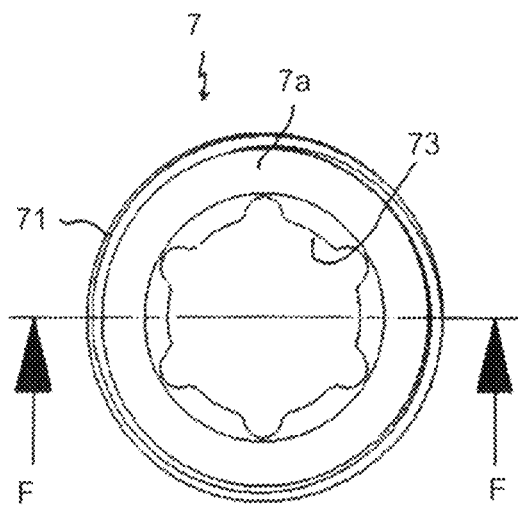
FIG. 19 shows a top view of the first insert member of FIG. 18.
Figure 20:
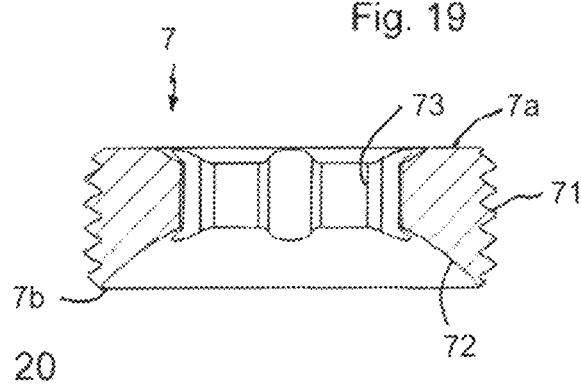
FIG. 20 shows a cross-sectional view of the first insert member of FIGS. 18 and 19, the cross-section taken along line F-F in FIG. 19.
Figure 26:
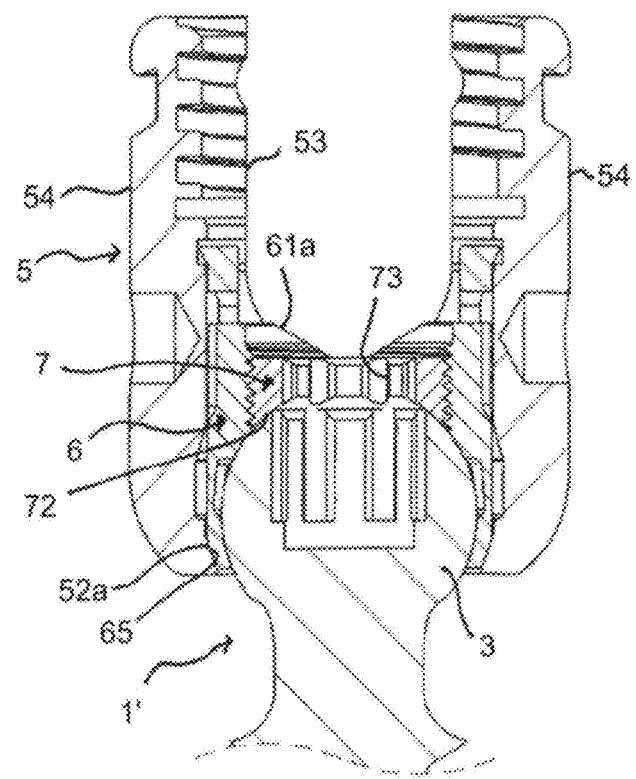
FIG. 26 shows a cross-sectional view of a bone anchoring device in the form of a polyaxial bone anchoring device using the coupling device and the second bone anchor as well as the first insert member of the system of FIG. 1, wherein the cross-section is taken in a plane including the central axis of the coupling device and extending perpendicular to a longitudinal axis of the rod channel.
Figure 27:
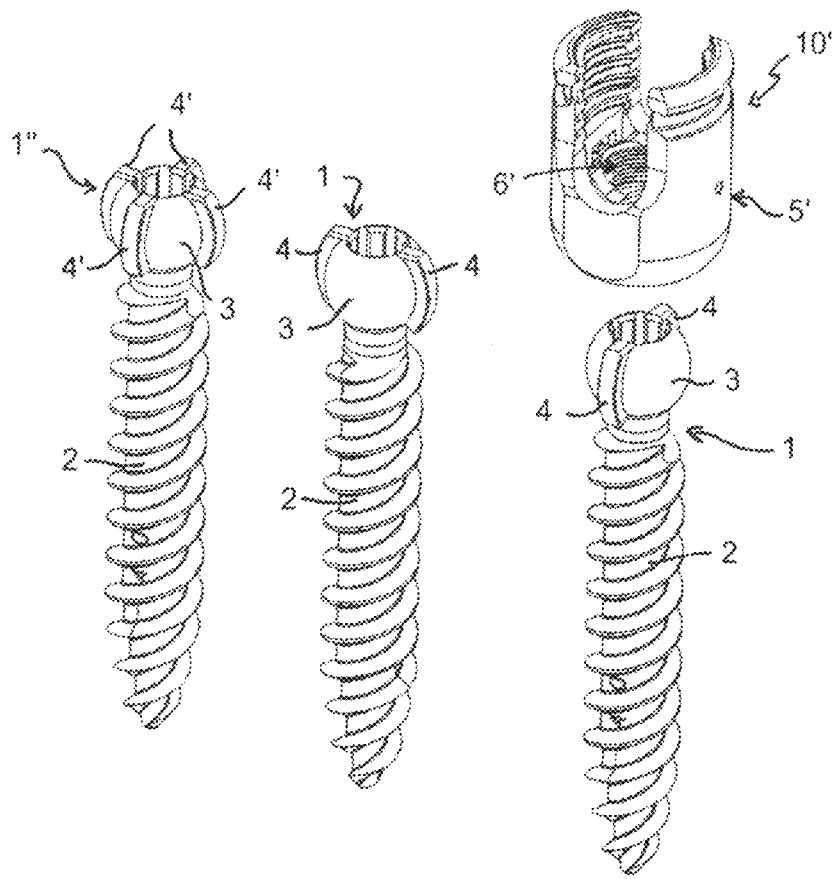
FIG. 27 shows a perspective view of a system according to a further embodiment, the system including a coupling device, the first bone anchor of the system of FIG. 1, and a third bone anchor, wherein the first bone anchor and the third bone anchor can be used in an interchangeable manner.

Referring to FIGS. 18 to 20, the first insert member 7 is substantially a set-screw like member that has a first end or top end 7a and a second end or bottom end 7b. When the insert member 7 is assembled with the pressure member 6, the top end 7a of the insert member 7 faces towards the top end 6a of the pressure member 6. The outer surface 71 of the insert member 7 is threaded so that it can be screwed into the threaded bore 69 of the pressure member 6 and advanced therein, as can be seen in FIG. 26. Furthermore, at the bottom end 7b, a spherically-shaped recess 72 is formed that matches the shape of the spherical outer surface portion of the head 3' of the second bone anchor 1'. The size of the spherically-shaped recess 72 is such that the recess 72 is configured to cover at least a portion of the spherically-shaped outer surface portion of the head 3' when the head 3' is in the head receiving portion 66 of the pressure member 6. Moreover, a tool engagement recess 73 is provided at the top end 7a that may extend fully through the insert member 7 in the axial direction. The tool engagement recess 73 may have any shape suitable for engagement with a tool, such as, for example, a polygon shape or a torx-like or a star-like shape.

Figure 21:
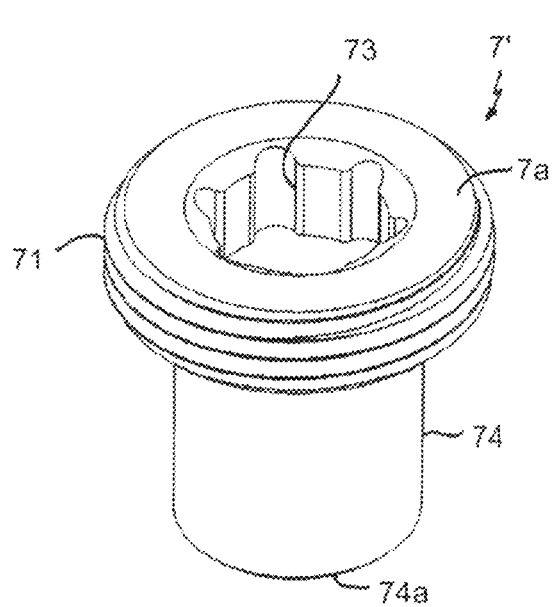
FIG. 21 shows a perspective view from a top of a second insert member of the system of FIG. 1.
Figure 22:
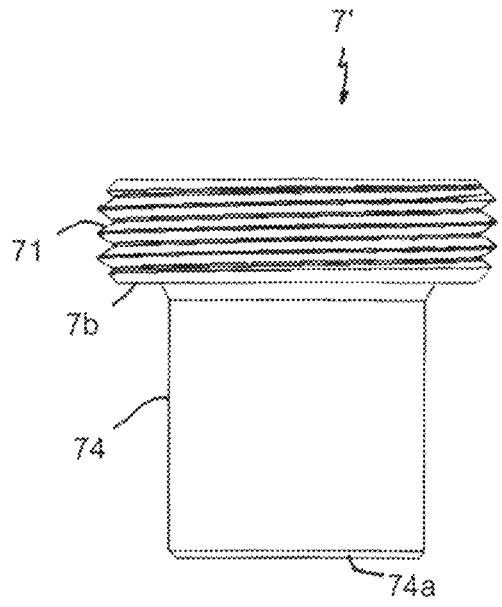
FIG. 22 shows a side view of the second insert member of FIG. 21.
Figure 25:
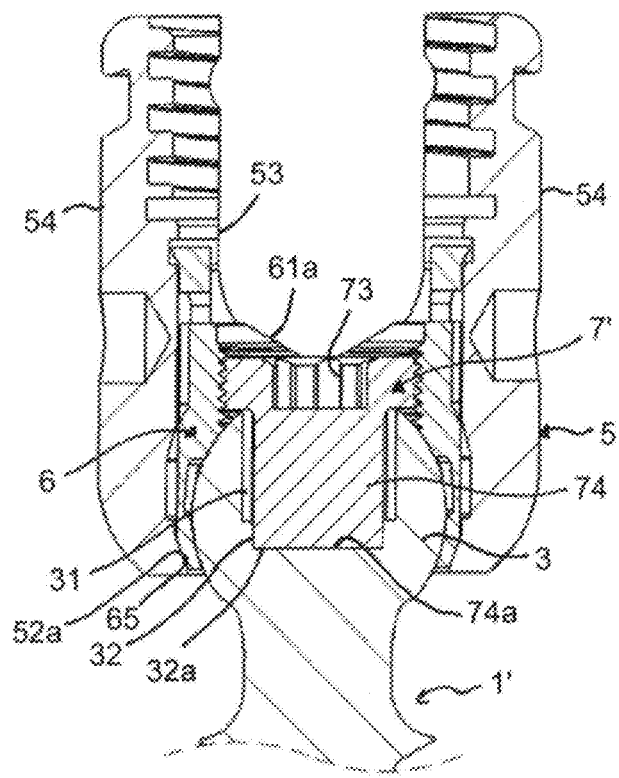
FIG. 25 shows a cross-sectional view of a bone anchoring device in the form of a monoaxial bone anchoring device using the coupling device and the second bone anchor as well as the second insert member of the system of FIG. 1, wherein the cross-section is taken in a plane including the central axis of the coupling device and extending perpendicular to a longitudinal axis of the rod channel.

Referring now to FIGS. 21 and 22, the second insert member 7' includes an upper set-screw like portion with a threaded external surface 71 and with the tool engagement recess 73. Adjacent to the upper portion, a lower portion 74 is formed that has the shape of a cylindrical post with a diameter that is smaller than that of the upper portion. In greater detail, the cylindrical post 74 has a diameter and a length such that when the head 3 of the first bone anchor 1 or the head 3' of the second bone anchor 1' is in the pressure member 6 and the second insert member 7' is positioned in the threaded bore 69, the cylindrical post 74 engages the recess 32 at the end surface of the head. Due to this form-fit connection, the head of the bone anchor is prevented from pivoting at all. The post 74 may enter the recess 32 to an extent such that a bottom end 74a of the post 74 abuts against the bottom 32a of the recess 32, as shown in FIG. 25.

The parts and portions of the coupling device and the bone anchors may be made of any material, preferably, however, of titanium or stainless steel or of any bio-compatible metal or metal alloy or plastic material. For bio-compatible alloys, a NiTi alloy, for example, Nitinol, may be used. Other materials that can be used are magnesium or magnesium alloys. Bio-compatible plastic materials that can be used may be, for example, polyether ether ketone (PEEK) or poly-L-lactide acid (PLLA). The respective parts can be made of the same material or materials, or of different materials from one another.

The coupling device may be pre-assembled. For assembly, the pressure member 6 is inserted into the receiving part from the top end 5a until the rim 62a enters the undercut 55b. The recess 58 of the receiving part 5 and the recess 600 of the pressure member 6 are aligned and located between the respective legs 54 of the receiving part 5. A crimping step may be carried out with a crimping tool engaging the crimp bores 59, such that the protrusions that arise from the crimping enter the grooves 64b at the fingers 64. As a result, the pressure member 6 is prevented from rotating relative to the receiving part 5.

Prior to connecting the coupling device 10 to a bone anchor, the pressure member 6 is at an insertion position, in which the head receiving portion 66 of the pressure member 6 can expand in the accommodation space of the head receiving portion 52 of the receiving part 5 when the head in inserted. In the insertion position, the pressure member 6 is prevented from moving towards the top end 5a of the receiving part 5, since the top end 6a of the pressure member 6 abuts against the upper edge of the undercut 55b. The pre-assembled coupling device 10 can be connected to a bone anchor either prior to inserting the bone anchor into bone or after the bone anchor has been inserted into bone. In both cases, the head of the bone anchor is inserted into the receiving part through the lower opening 52b and further moved into the head receiving portion 66 of the pressure member 6. Due to the slits 68 in the head receiving portion 66, the pressure member 6 snaps onto the head. Thereafter, the pressure member 6 is moved downward until the rim 62a enters the groove 56 on the inner wall of the receiving part. In this pre-locking position, an inserted head 3 can no longer be removed through the lower opening 52b.

A system including the coupling device and the at least two bone anchors including the first bone anchor 1 and the second bone anchor 1' allows a user to selectively combine the coupling device 10 with either the first bone anchor 1 or the second bone anchor 1'. Hence, using the same coupling device 10, either a monoplanar bone anchoring device or a polyaxial bone anchoring device can be assembled.

Figure 23:
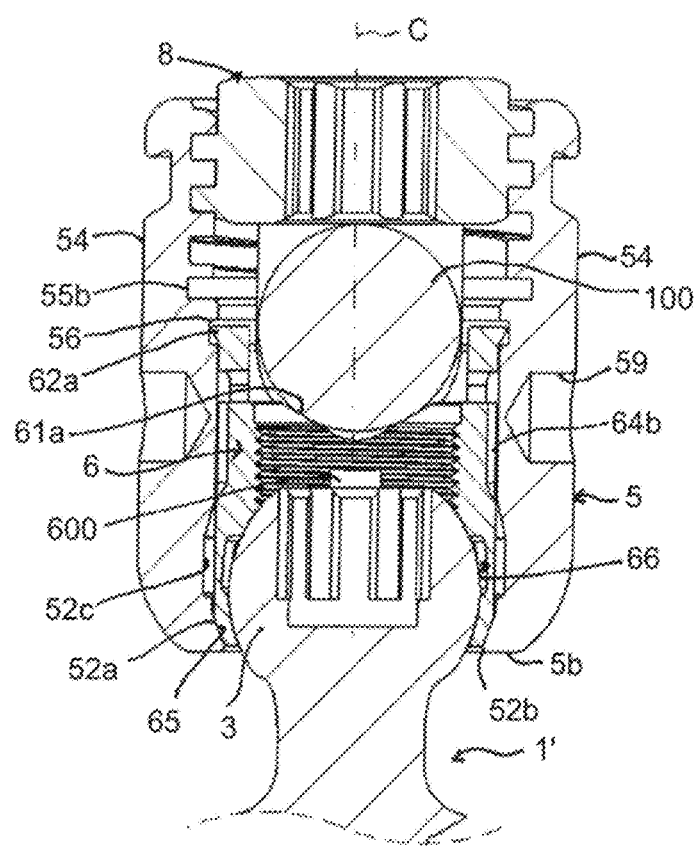
FIG. 23 shows a cross-sectional view of an embodiment of a bone anchoring device in the form of a polyaxial bone anchoring device using the coupling device and the second bone anchor of the system of FIG. 1, wherein the cross-section is taken in a plane extending through the receiving part and extending perpendicular to a longitudinal axis of an inserted rod.

As shown in FIG. 23, when the second bone anchor 1' is inserted into the coupling device, the second bone anchor 1' is configured to pivot around the central axis C in multiple planes. The restraining structures in the form of the recesses 58, 600 provided at the receiving part 5 and the pressure member 6, respectively, do not limit, i.e., has no influence on the pivoting motion of the second bone anchor 1'. After insertion of the rod 100, the fixation member 8 is screwed between the legs 55 until the fixation member presses via the rod 100 onto the pressure member 6, such that the pressure member is moved slightly downwards. The narrowing portion 52a of the receiving part and the narrowing portion 65 of the pressure member engage. By tightening the fixation member 8, the head 3' is locked in a particular angular position.

Figure 24:
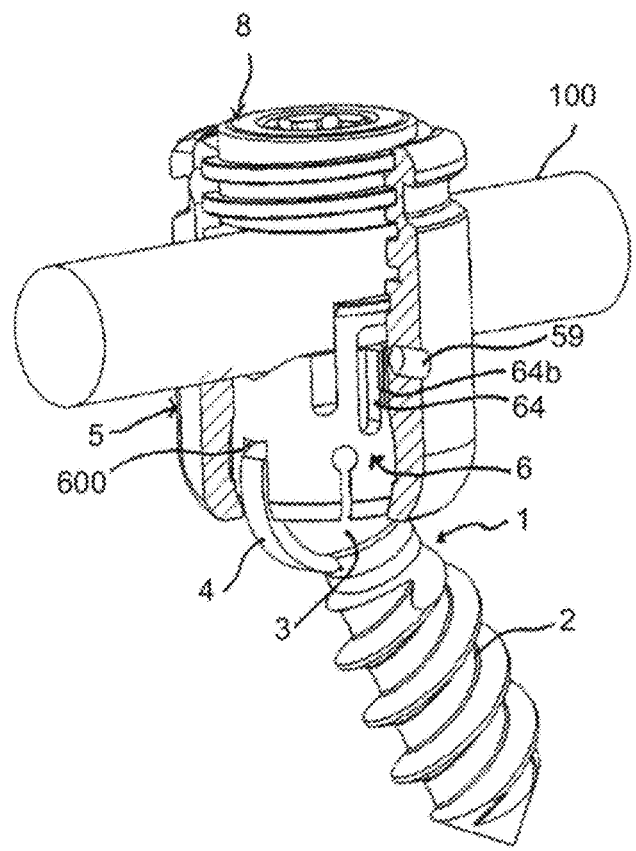
FIG. 24 shows a perspective view, partly in cross-section, of a bone anchoring device in the form of a monoplanar bone anchoring device using the coupling device and the first bone anchor of the system of FIG. 1.

In the bone anchoring device shown in FIG. 24, the first bone anchor 1 is combined with the coupling device 10. For insertion, the head 3 is oriented with respect to the coupling device in a manner such that the wings 4 can engage the recesses 58 of the receiving part and 600 of the pressure member, respectively. By means of this, the pivoting motion of the first bone anchor 1 relative to the coupling device is restricted to a single plane. In the embodiment, due to the position of the restraining structure, the single plane is a plane defined by the central axis C and by the longitudinal axis L of the rod channel. After insertion of the rod 100, the fixation member 8 is screwed between the legs until the fixation member presses onto the rod 100, which in turn presses onto the pressure member to lock the head 3 in the coupling device.

FIGS. 25 and 26 show combinations of the coupling device 10 with the first or the second bone anchor in a situation in which the rod has not yet been inserted. The insert members 7, 7' allow a user to carry out alignment and/or adjustment steps while the head can be locked without using the rod 100 and the fixation member 8.

In FIG. 25 the second bone anchor 1' is combined with the coupling device 10. In addition, the second insert member 7' is positioned within the threaded bore 69 of the pressure member 6 and screwed in until the second insert member engages the recess 32 and abuts against the bottom 32a. A form-fit connection is achieved between the cylindrical post 74 and the head 3' of the second bone anchor 1', such that the second bone anchor 1' can no longer pivot. Simultaneously, the head 3' is pressed towards the lower portion of the receiving part which is narrowed by the pressure member 6. As a result, a monoaxial bone anchoring device is generated, with the shank axis S being coaxial with the central axis C of the receiving part 5. The monoaxial functionality can be removed by removing the second insert member 7'. Alternatively it is possible to leave the second insert member 7' in place, so that a permanent monoaxial bone anchoring device is formed.

The second insert member 7' can be used in a similar manner when the coupling device 10 is combined with the first bone anchor 1 to form a monoaxial bone anchoring device from a monoplanar bone anchoring device.

FIG. 26 shows a polyaxial bone anchoring device including the coupling device 10 and the second bone anchor 1', where the first insert member 7 is used. The first insert member 7 is screwed into the threaded bore 69 until the first insert member contacts the head 3' that enters into the recess 72. By adjusting the axial position of the first insert member 7, the friction force exerted onto the head 3' can be adjusted. Hence, a friction force can be generated that maintains the second bone anchor 1' at a desired angular position relative to the coupling device without the need of having the rod and a fixation member assembled. The friction force may be adjusted such that the force can be overcome by manually pivoting the receiving part relative to the bone anchor. Alternatively, the friction force may be adjusted such that the head in the coupling device is provisionally locked.

In both cases shown in FIGS. 25 and 26, after adjusting the position of the bone anchor relative to the coupling device, the rod can be inserted and the head can be finally locked by tightening the fixation member 8.

Next, a system including a coupling device and at least two bone anchors according to a further embodiment will be described with reference to FIGS. 27 to 38. The system depicted in FIG. 27 includes at least the first bone anchor 1 of the first type described above and a third bone anchor 1" of a third type, and a coupling device 10' according to a second embodiment. The coupling device 10' includes a receiving part 5' and a pressure member 6' and is selectively connectable to the first bone anchor 1 or the third bone anchor 1". Preferably the receiving part 5' is a monolithic piece and/or the pressure member 6' is a monolithic piece. Optionally, the system may further include the first insert member 7 and/or the second insert member 7' and/or a fixation device in the form of, for example, the fixation screw 8 for securing and fixing a rod 100 in the receiving part 5', as described above for the first embodiment (not shown in FIG. 27, see FIG. 1).

When the coupling device 10' is assembled with the first bone anchor 1, the resulting bone anchoring device is an monoplanar bone anchoring device in which the first bone anchor 1 can pivot only in a single plane. Depending on the position or orientation in which the first bone anchor is assembled with the coupling device 10', the first bone anchor 1 is pivotable in a single first plane or in a single second plane different from the first plane, as explained in greater detail below. When the coupling device is assembled with the third bone anchor 1", the resulting bone anchoring device is a monoaxial bone anchoring device in which the third bone anchor 1" is pivotably fixed with respect to the coupling device 10', i.e., is prevented from pivoting relative to the coupling device 10'. The first bone anchor 1 and the third bone anchor 1" may be interchangeably used together with the same coupling device 10'.

The coupling device 10' of the second embodiment depicted in FIGS. 27 to 36 differs from the coupling device 10 of the first embodiment depicted in FIGS. 1 to 26 with respect to the configuration of the restraining structure. In the figures, parts and portions of the coupling device 10' of the second embodiment that are the same or similar to those of the coupling device 10 of the first embodiment are marked with the same reference numerals, and descriptions thereof will not be repeated.

Figure 28:
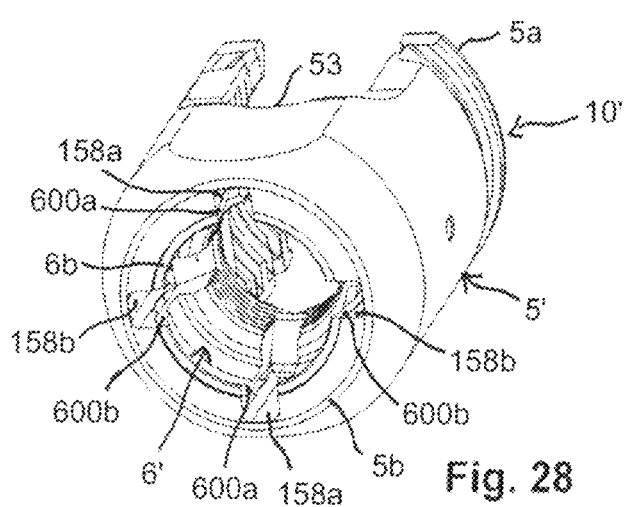
FIG. 28 shows a perspective view from a bottom of the coupling device of FIG. 27.

As can best be seen in FIG. 28, the coupling device 10' of the second embodiment differs from the coupling device 10 of the first embodiment specifically in that the restraining structure of the coupling device 10' includes a plurality of recesses or slots 600a, 600b formed in the lower portion of the pressure member 6' the number of which is such that at least two different distinct pivot planes can be defined. Also, a corresponding plurality of recesses or slots 158a, 158b are formed at the bottom end 5b of the receiving part 5'. The receiving part 5' will now be described in greater detail, with reference to FIGS. 29 to 32, and the pressure member 6' with reference to FIGS. 33 to 36.

The receiving part 5' has, at its bottom end 5b, four recesses or slots 158a, 158b, each recess extending from the bottom end 5b to approximately the portion 51a of the passage 51 that has a substantially constant width in the receiving part 5'. The four recesses 158a, 158b are arranged in two opposing pairs of recesses. Specifically, two recesses 158a that form a first pair of recesses are offset from each other by 180° and are aligned with the channel axis L defined by the U-shaped recess 53 of the receiving part 5'. The other two recesses 158b that form a second pair of recesses are offset from each other by 180° and are aligned with an axis K that is perpendicular to the channel axis L. The recesses 158a may be similar to or the same as the recesses 58 of the receiving part 5 of the first embodiment described above. Hence, in the present embodiment, the four recesses 158a, 158b are equally spaced at 90° intervals around a circumference of the receiving part 5'. An inner contour of the recesses 158a, 158b may be substantially rectangular with rounded edges 58a (see FIG. 30).

The recesses 158a, 158b enable insertion of the head 3 of the first or the third bone anchor 1, 1" from the bottom end 5b of the receiving part 5', similarly as discussed above with respect to the first embodiment. Specifically, the recesses 158a, 158b define a restraining structure or a part of a restraining structure that restrains a pivoting motion of an inserted head of the first bone anchor to a single plane including the central axis C, and/or prevents a pivoting motion of an inserted head of the third bone anchor 1" relative to the receiving part 5'.

The pressure member 6' has four recesses or slots 600a, 600b that are formed in the lower portion thereof. The four recesses 600a, 600b are arranged in two opposing pairs of recesses. Specifically, two recesses 600a that form a first pair of recesses are offset from each other by 180° and are aligned with the longitudinal axis I of the rod support surface 61a. The other two recesses 600b that form a second pair of recesses are offset from each other by 180° and are aligned with an axis k that is perpendicular to the longitudinal axis I of the rod support surface 61a. Hence, in the present embodiment, the four recesses 600a, 600b are equally spaced at 90° intervals around a circumference of the pressure member 6'. The recesses 600a may be similar to or the same as the recesses 600 of the pressure member 6 of the first embodiment described above.

An inner contour of the recesses 600a, 600b may be rectangular (see FIG. 36). The recesses 600a, 600b are open to the second end 6b and closed towards the first end 6a of the pressure member 6'. The recesses 600a, 600b may extend in the axial direction into the wall of the threaded bore 69. The size of the recesses 600a, 600b is such that the wings 4 of the first bone anchor 1 can selectively extend into the first pair of recesses 600a or into the second pair of recesses 600b and pivot therein, and the wings 4' of the third bone anchor 1" (see below) can extend into the first pair of recesses 600a and the second pair of recesses 600b at the same time.

When the pressure member 6' is mounted to the receiving part 5', the recesses 600a, 600b of the pressure member 6' are aligned with the recesses 158a, 158b of the receiving part 5', respectively, as shown in FIG. 28. Thus, the recesses 600a, 600b define a restraining structure or part of a restraining structure. This restraining structure is on the one hand configured to restrain a pivoting motion of the first bone anchor 1 of the first type to a single plane that includes the central axis C. The central axis C may define the pivot axis. On the other hand, the restraining structure prevents a pivoting motion of an inserted head of the third bone anchor 1" relative to the central axis C.

As compared to the pressure member 6 of the first embodiment, the pressure member 6' of the second embodiment may be provided without additional slits 68 that render the head receiving portion 66 flexible. The four recesses 600a, 600b of the pressure member 6' may provide flexibility to the head receiving portion 66 so that the pressure member 6' can snap onto a head of a bone anchor during assembly of the bone anchor with the coupling device 10'.

Figure 37:
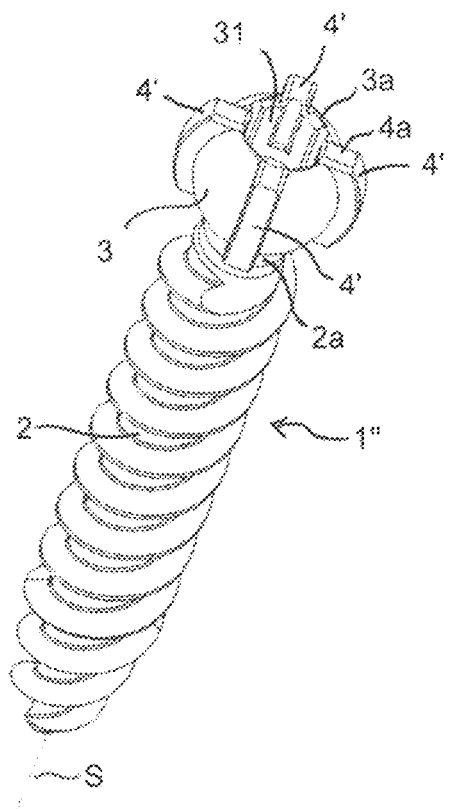
FIG. 37 shows a perspective view from a top of the third bone anchor of the system of FIG. 27.
Figure 38:
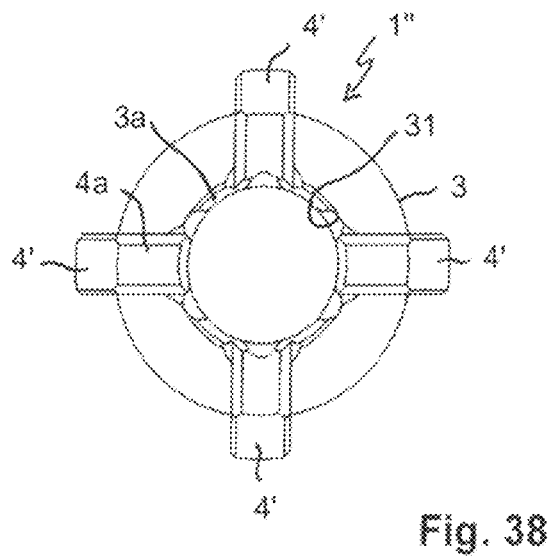
FIG. 38 shows a top view of the third bone anchor of FIG. 37.

The third bone anchor 1" will now be described in more detail with further reference to FIGS. 37 and 38. The third bone anchor 1" differs from the first bone anchor 1 described above in that the third bone anchor has four wings 4' forming a restraining structure. Specifically, the third bone anchor 1" has a first pair of wings on opposite sides of the head and a second pair of wings similar to the first pair of wings and offset from the first pair of wings by 90°. The four wings 4' of the third bone anchor are thus equally spaced at 90° intervals around a circumference of the spherical outer surface portion of the head 3.

Similar to the wings 4 of the first bone anchor (see FIGS. 12-14), the wings 4' of the third bone anchor 1" each has a shape of a segment of a spherical shell, i.e., has an elongate shape, with a main extension direction corresponding to the shank axis S along an outside of the spherical outer surface portion of the head 3. A width of the wings 4' is such that, when the head 3 is received in the head receiving portion 66 of the pressure member 6', the wings 4' can extend into the recesses 600a, 600b. Thus, the wings 4' form a restraining structure or a part of a restraining structure that cooperates with the corresponding restraining structure formed by the recesses 600a, 600b provided at the pressure member 6', to prevent a pivoting motion of the head 3 in the head receiving portion 66. It shall be noted that the width of the wings 4' is such that when the head 3 passes through the lower opening 52b of the receiving part 5' during insertion, the wings 4' can pass through the recesses 158a, 158b at the bottom end 5b of the receiving part 5'.

The steps of assembling the coupling device 10' of the second embodiment and inserting a head of a bone anchor are similar to those of the coupling device 10 of the first embodiment and will not be repeated here. The system including the coupling device 10' and the at least two bone anchors including the first bone anchor 1 and the third bone anchor 1" allows a user to selectively combine the coupling device 10' with either the first bone anchor 1 or the third bone anchor 1". Hence, using the same coupling device 10', either a monoplanar bone anchoring device with the choice between two different pivot planes as explained below, or a monoaxial bone anchoring device, can be obtained.

When the first bone anchor 1 is combined with the coupling device 10', the head 3 can be oriented with respect to the coupling device 10' in two positions during insertion. In a first position, the head 3 is oriented such that the wings 4 engage the first pair of recesses 158a of the receiving part 5' and the first pair of recesses 600a of the pressure member 6'. In this position, the pivoting motion of the first bone anchor 1 is restricted to a single plane that is defined by the central axis C and by the longitudinal axis L of the rod channel. In a second position, the head 3 is oriented such that the wings 4 engage the second pair of recesses 158b of the receiving part 5' and the second pair of recesses 600b of the pressure member 6'. In this position, the pivoting motion of the first bone anchor 1 is restricted to a single plane that is defined by the central axis C and by the axis K that is perpendicular to the longitudinal axis L of the rod channel.

When the third bone anchor 1" is combined with the coupling device 10', the head 3 is oriented such that each of the four wings 4' can engage one of the recesses 158a, 158b of the receiving part 5' and the respectively aligned recesses 600a, 600b of the pressure member 6'. In this position, any pivoting motion of the third bone anchor 1" with respect to the central axis C is prevented.

It should be noted that the second bone anchor 1' described above (FIGS. 15-17) can also be combined with the coupling device 10' of the second embodiment. Because the second bone anchor 1' is free from any restraining structures, the second bone anchor 1' is configured to pivot around the central axis C in multiple planes when inserted into the coupling device 10'. The system described above with reference to FIGS. 27 to 36 can therefore generally include the coupling device 10' and at least two bone anchors selected from a group including the first bone anchor 1 of the first type, the second bone anchor 1' of the second type, or the third bone anchor 1" of the third type.

Next, a first embodiment of an instrument for inserting the first bone anchor 1 into bone will be described with additional reference to FIGS. 39 to 41.

The instrument 200 includes a substantially rod-shaped main portion 201 extending from a first end (not shown in the figures) that may include a gripping portion (also not shown in the figures) to a second end 201b. The main portion 201 may be provided with a flattened portion 202 adjacent to the second end 201b, which may be generated by cutting away a part of the front section of the rod-shaped main portion 201. A U-shaped recess 203 is formed at a center of the flattened portion 202, and is open to the second end 201b of the instrument and shaped so as to receive at least a portion of the spherically-shaped outer surface portion of the head 3 of the bone anchor 1 therein. The recess 203 may have a shape that is complementary to the spherically-shaped portion of the head 3 at least in a portion thereof, so as to contact the inserted head 3 at least in a portion thereof (see FIG. 41). The U-shaped recess 203 divides the flattened portion 202 into two legs 202a, 202b.

Two grooves 204 are formed in the inner surfaces of the legs 202a, 202b that face the U-shaped recess 203 and that are open to the second end 201b of the main portion 201. The size of the grooves 204 and their arrangement on the instrument 200 is such that they can engage the wings 4 of the first bone anchor 1 so as to transmit a force, in particular a torque, from the instrument 200 onto the bone anchor 1.

Optionally, a protrusion 205 can be formed in the U-shaped recess 203, where the protrusion extends between the two legs 202a, 202b towards the second end 201b of the instrument. An outer contour of the protrusion 205 is sized and shaped so as to engage the tool engagement recess 31 provided at the free end 3a of the head 3 of the first bone anchor 1 or the second bone anchor 1'. For example, the protrusion may have a polygon or any other shape such as, for example, a torx-shaped or star-shaped or other axial groove-shaped structure suitable to transmit a force, in particular a torque, from the instrument 200 onto the bone anchor 1, 1'. In a modification, the recess 203 may be spherically-shaped in a manner such that the recess covers only the upper portion of the head 3.

In order to insert, in particular screw, the bone anchor 1 into bone, the instrument 200 is combined with the bone anchor 1, as depicted in FIGS. 40 and 41. As shown in FIG. 40, the instrument 200 is advanced towards the head 3 of the bone anchor 1 with its second end 201b facing the head 3 and the grooves 204 of the instrument 200 aligned with the wings 4 of the head 3. The grooves 204 then engage the wings 4 of the head 3 and may serve as a guiding structure to attach the instrument 200 to the head 3 of the bone anchor 1.

When the instrument 200 is attached to the head 3 of the bone anchor 1, as shown in FIG. 41, the protrusion 205 of the instrument engages the tool engagement recess 31 of the head 3, and the grooves 204 engage the wings 4 of the head 3. The head 3 is received within the U-shaped recess 203 and is laterally enclosed between the two legs 202a, 202b of the instrument 200. Thus, the bone anchor is prevented from rotating relative to the instrument, and a force, in particular a torque, may be transmitted from the instrument 200 onto the bone anchor 1 to insert, in particular screw, the bone anchor 1 into bone. "Rotating" here refers to a rotation of the bone anchor around the shank axis S of the shank 2. The instrument 200 can also be used to insert the third bone anchor 1" or the second bone anchor 1 into bone.

It should be noted that the instrument 200 may be provided without the protrusion 205, and optionally the bone anchor 1 may be provided without the tool engagement recess 31, because the engagement of the grooves 204 with the wings 4 of the head 3 may be sufficient to transmit the force or torque from the instrument onto the head of the bone anchor to implant the bone anchor into bone. If the instrument 200 is provided without the protrusion 205, the head 3 may pivot relative to the main portion 201 of the instrument with the wings 4 of the head 3 received within the grooves 204. "Pivot" here refers to a pivoting motion of the shank axis S of the shank 2 relative to an axis of the main portion 201 of the instrument 200. This allows a user to couple the bone anchor 1 to the instrument 200 in a position where the shank axis S and the main portion 201 of the instrument are provided at an angle, i.e., not parallel or coaxial. In some clinical situations such an angled engagement may be advantageous.

Figure 42:
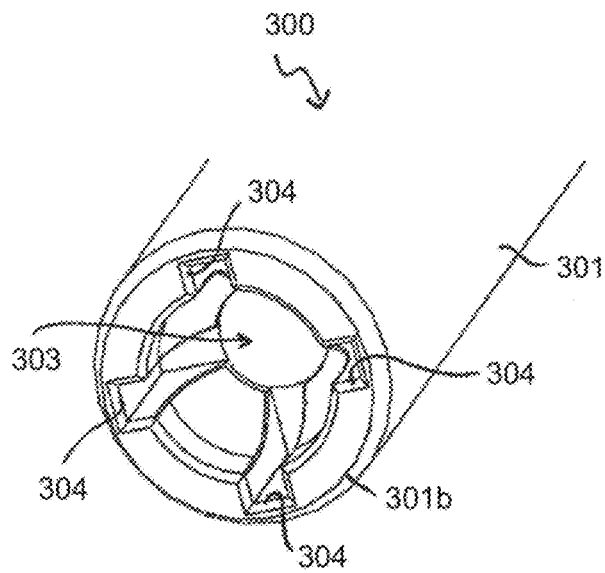
FIG. 42 shows a perspective view of a portion of an instrument for inserting a bone anchor into bone according to a further embodiment, wherein the bone anchor has a restraining structure.
Figure 43:
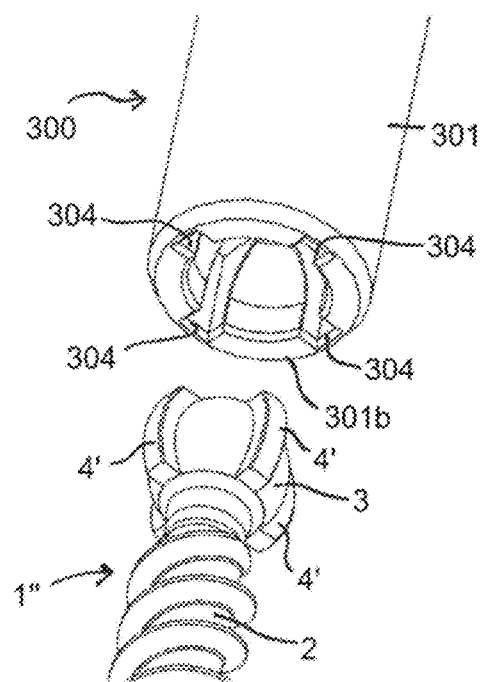
FIG. 43 shows a perspective view of a portion of the instrument of FIG. 42 and the third bone anchor of FIGS. 37 and 38.

FIGS. 42 and 43 show a second embodiment of an instrument 300 for inserting the first bone anchor 1 or third bone anchor 1" into bone. The instrument 300 includes a substantially rod-shaped main portion 301 extending from a first end (not shown in the figures) that may include a gripping portion (also not shown in the figures) to a second end 301b. A spherically-shaped recess 303 is formed at the second end 301b at a center of the main portion 301. The spherically-shaped recess 303 is open to the second end 301b and closed towards the first end of the instrument, and is shaped so as to receive at least a portion of the spherically-shaped outer surface portion of the head 3 of the third bone anchor 1" therein. The recess 303 may have a shape complementary to the spherically-shaped portion of the head 3, or at least a portion thereof, so as to facilitate contact with the inserted head 3.

Four grooves 304 are formed in an inner surface of the main portion 301 in the region of the spherically-shaped recess 303 such that they are open to the second end 301b. The size of the grooves 304 and their arrangement on the instrument 300 is such that the grooves can engage the four wings 4' of the third bone anchor 1" and/or the two wings 4 of the first bone anchor 1, so as to transmit a force, in particular a torque, from the instrument 300 onto the first or third bone anchor 1, 1", respectively. Specifically, in the present embodiment, the grooves 304 are equally spaced at 90° intervals around a circumference of the spherically-shaped recess 303. Preferably, the grooves 304 are shaped to permit the wings 4 of the first bone anchor 1 to pivot therein, i.e., to allow for a pivoting motion of the shank axis S of the shank 2 relative to an axis of the main portion 301 of the instrument 300.

In order to insert, in particular screw, the third bone anchor 1" into bone, the instrument 300 is combined with the third bone anchor 1" by an engagement of the grooves 304 with the wings 4' of the head 3, as schematically depicted in FIG. 43.

When the instrument 300 is attached to the head 3 of the third bone anchor 1", each of the four grooves 304 engages one of the wings 4' of the bone anchor 1" to establish a form-fit connection. By means of this, a force, in particular a torque, may be transmitted from the instrument 300 onto the third bone anchor 1" to insert, in particular screw, the bone anchor 1" into bone. The instrument 300 can also be used to insert the first bone anchor 1 into bone.

Further modifications of the above described embodiments are also conceivable. For example, the restraining structures in the receiving part and the pressure member can be at another position, so that the single pivot plane can be arranged at an angle with respect to the channel axis. It may also be conceivable, that more than one set of restraining structures are provided at different locations such that several distinct pivot planes can be provided, one of which can be selected when inserting the first bone anchor. For example two, three, or more distinct pivot planes can be implemented.

In the coupling device of the second embodiment, which is described above with reference to FIGS. 27 to 36, the first pair of recesses 158a and 600a at the receiving part and pressure member define, together with the pivot axis or central axis C, a first plane in which the monoplanar pivoting motion of the first bone anchor 1 takes place, and the second pair of recesses 158b and 600b define, together with the pivot axis or central axis C, a second plane in which the monoplanar pivoting motion of the first bone anchor 1 takes place. By selecting the positions of the first and/or second pairs of recesses when manufacturing the coupling device, the pivot planes of the first bone anchor can be accordingly defined.

The first and/or third bone anchor may have wings or another restraining structure which are formed at a distance from the free end of the head. In this case, the first insert member can also be used with the first bone anchor to achieve a friction force between the insert member and the head for the bone anchoring device when the bone anchoring device is in a monoplanar configuration.

In a further modification, the receiving part and the pressure member may be designed for top loading of the bone anchor. In such a case, the receiving part may have, adjacent to the bottom end, a seat portion for directly and pivotably receiving the head of the bone anchor. The pressure member may be shaped so as to exert pressure only from the top onto an inserted head.

For all embodiments, it is also possible that the shape of the head receiving portion of the coupling device is arranged such that the pivot axis is angled with respect to the central axis C, so as to provide a greater pivot angle to one side compared to an opposite side.

It shall be noted that particular shapes of the elements are not limited to the specific shapes shown in the drawings, but may vary.

The bone anchor is also not limited to having a threaded shank. All types of bone anchors that are suitable for anchoring in bone or vertebrae may be used.

Instead of the fixation device described, other known fixation devices may be implemented, such as, for example, a bayonet fixation device or a two part fixation device that allows the independent fixation of the rod and the head.

While the present invention has been described in connection with certain exemplary embodiments, it is to be understood that the invention is not limited to the disclosed embodiments, but is instead intended to cover various modifications and equivalent arrangements included within the spirit and scope of the appended claims, and equivalents thereof.

What is claimed is:

1. A system for coupling a rod to bone, the system comprising:
a first bone anchor comprising a first shank for anchoring to bone and a first head;
a second bone anchor different from the first bone anchor and comprising a second shank for anchoring to bone and a second head; and
a coupling device comprising:
a receiving part having a rod receiving portion for receiving a rod, a head receiving portion for interchangeably receiving the first head of the first bone anchor or the second head of the second bone anchor, and a central axis that extends through the rod receiving portion and the head receiving portion; and
a pressure member configured to exert pressure on the first or second head when the first or second head is in the receiving part to clamp the first or second head at a particular position relative to the receiving part;
wherein the coupling device comprises a restraining surface configured to cooperate with the first bone anchor to restrict pivoting of the first bone anchor relative to the receiving part to a single plane that includes the central axis, and wherein the coupling device is configured to cooperate with the second bone anchor to restrict pivoting of the second bone anchor relative to the receiving part differently than the restricted pivoting of the first bone anchor relative to the receiving part.

2. The system of claim 1, wherein the second bone anchor is configured to pivot in a plurality of planes that include the central axis relative to the receiving part.

3. The system of claim 1, wherein the second bone anchor is prevented from pivoting away from the central axis of the receiving part in every radial direction.

4. The system of claim 1, wherein the restraining surface is formed by a first recess on the pressure member that is configured to cooperate with a corresponding restraining surface of the first bone anchor to restrict pivoting of the first bone anchor to the single plane.

5. The system of claim 1, wherein the pressure member comprises a head receiving portion configured to receive the first or second head, the head receiving portion defining a lower opening, wherein the restraining surface is adjacent to the lower opening.

6. The system of claim 1, wherein the pressure member defines a support surface for the rod, and wherein the restraining surface is aligned with a longitudinal axis of the support surface, such that the single plane is defined by the central axis and the longitudinal axis of the support surface.

7. The system of claim 1, wherein the pressure member defines a support surface for the rod, and wherein the restraining surface is oriented at a first angle transverse to a longitudinal axis of the support surface, such that the single plane is defined by the central axis and an axis oriented at the first angle transverse to the longitudinal axis of the support surface.

8. The system of claim 1, wherein the pressure member defines a support surface for the rod, wherein the restraining surface comprises a first pair of recesses aligned with a longitudinal axis of the support surface and a second pair of recesses oriented at a first angle transverse to the longitudinal axis of the support surface.

9. The system of claim 8, wherein the first bone anchor is connectable to the coupling device such that the single plane is selectively aligned with the longitudinal axis of the support surface or with the first angle transverse to the longitudinal axis of the support surface.

10. The system of claim 8, wherein the second bone anchor is connectable to the coupling device in a manner such that the second bone anchor is prevented from pivoting away from the central axis of the receiving part in every radial direction.

11. The system of claim 1, wherein the restraining surface comprises a first restraining surface formed on the receiving part and a second restraining surface formed on the pressure member.

12. The system of claim 1, wherein the receiving part has a first end and an opposite second end, and wherein the head receiving portion defines an opening at the second end that has a width that is greater than a greatest outer diameter of both the first and second heads to facilitate insertion of the first or second head through the opening at the second end into the receiving part.

13. The system of claim 1, further comprising an insert member that is positionable at least partially in the pressure member and movable from a first position to a second position relative to the pressure member to exert an adjustable pressure on the first or second head when the first or second head is in the receiving part to clamp the first or second head relative to the receiving part.

14. The system of claim 13, wherein the insert member comprises a projection configured to engage a recess formed in the first or second head to provide a form-fit connection between the projection and the first or second head that prevents the corresponding bone anchor from pivoting away from the central axis of the receiving part in every radial direction.

15. The system of claim 1, further comprising a third bone anchor, wherein the second bone anchor is configured to pivot in a plurality of planes that include the central axis relative to the receiving part, and wherein the third bone anchor is prevented from pivoting away from the central axis of the receiving part in every radial direction.

16. The system of claim 1, wherein the first head of the first bone anchor comprises a substantially spherically-shaped outer surface portion and at least one wing that extends away from the outer surface portion that is configured to cooperate with the restraining surface of the coupling device.

17. The system of claim 1, wherein the second head of the second bone anchor comprises a substantially spherically-shaped outer surface portion and at least two wings that extend away from the outer surface portion that are configured to cooperate with the restraining surface of the coupling device, and wherein the at least two wings are spaced apart from one another in a circumferential direction by less than 180°.

18. The system of claim 1, wherein the restraining surface of the coupling device is arranged symmetrically relative to a plane that includes the central axis and a longitudinal axis of a rod channel that extends through the rod receiving portion.

19. The system of claim 1, wherein the second head of the second bone anchor has a spherically-shaped outer surface portion that is free from any restraining surfaces configured to engage to the restraining surface of the coupling device.

20. The system of claim 1, further comprising an instrument for anchoring the first bone anchor and/or the second bone anchor to bone, wherein at least one of the first head or the second head comprises a corresponding restraining surface configured to cooperate with the restraining surface of the coupling device, and wherein the instrument comprises an engagement structure configured to accommodate the corresponding restraining surface of the at least one of the first head or the second head.

21. A method for coupling a rod to a bone using a system comprising a first bone anchor comprising a first shank for anchoring to bone and a first head, a second bone anchor different from the first bone anchor and comprising a second shank for anchoring to bone and a second head and a coupling device comprising a receiving part having a rod receiving portion for receiving a rod, a head receiving portion for interchangeably receiving the first head of the first bone anchor or the second head of the second bone anchor, and a central axis that extends through the rod receiving portion and the head receiving portion, and a pressure member configured to exert pressure on the first or second head when the first or second head is in the receiving part to clamp the first or second head at a particular position relative to the receiving part, and a fixation device, the method comprising:

selecting the first bone anchor or the second bone anchor to assemble to the coupling device, wherein the coupling device comprises a restraining surface configured to cooperate with the first bone anchor to restrict pivoting of the first bone anchor relative to the receiving part to a single plane that includes the central axis, and wherein the coupling device is configured to cooperate with the second bone anchor to restrict pivoting of the second bone anchor relative to the receiving part differently than the restricted pivoting of the first bone anchor relative to the receiving part;

implanting the selected bone anchor in bone;

adjusting the coupling device to a desired position;

inserting the rod into a recess of the rod receiving portion of the receiving part; and advancing the fixation device into the rod receiving portion to lock the rod and the head of the selected bone anchor relative to the coupling device.

22. A system for coupling a rod to bone, the system comprising:

a first bone anchor comprising a first shank for anchoring to bone and a first head with a free end defining a recess for a tool;

a second bone anchor different from the first bone anchor and comprising a second shank for anchoring to bone and a second head with a free end defining a recess for a tool; and a coupling device comprising:

a receiving part having a rod receiving portion for receiving a rod, a head receiving portion for interchangeably receiving the first head of the first bone anchor or the second head of the second bone anchor, and a central axis that extends through the rod receiving portion and the head receiving portion; and a pressure member configured to exert pressure on the first or second head when the first or second head is in the receiving part to clamp the first or second head at a particular position relative to the receiving part;

wherein the coupling device comprises a restraining surface configured to cooperate with the first bone anchor to prevent the first bone anchor from pivoting away from the central axis of the receiving part in every radial direction, and wherein the coupling device is configured to cooperate with the second bone anchor to facilitate pivoting of the second bone anchor away from the central axis of the receiving part.

23. The system of claim 22, wherein the coupling device is configured to cooperate with the second bone anchor to restrict pivoting of the second bone anchor relative to the receiving part to a single plane that includes the central axis.

24. The system of claim 22, wherein the first head of the first bone anchor comprises a substantially spherically-shaped outer surface portion and at least one projection that extends away from the outer surface portion at least partially in a radial direction relative to the central axis to cooperate with the restraining surface of the coupling device.

* * * * *